(12) United States Patent
McNamara et al.

(10) Patent No.: US 10,749,376 B2
(45) Date of Patent: Aug. 18, 2020

(54) SYSTEMS AND METHODS FOR AUXILIARY POWER MANAGEMENT OF BEHIND-THE-METER POWER LOADS

(71) Applicant: Lancium LLC, Houston, TX (US)

(72) Inventors: Michael T. McNamara, Newport Beach, CA (US); David J. Henson, Houston, TX (US); Raymond E. Cline, Jr., Houston, TX (US)

(73) Assignee: Lancium LLC, Houston, TX (US)

( * ) Notice: Subject to any disclaimer, the term of this patent is extended or adjusted under 35 U.S.C. 154(b) by 0 days.

(21) Appl. No.: 16/175,246

(22) Filed: Oct. 30, 2018

(65) Prior Publication Data

US 2020/0136432 A1 Apr. 30, 2020

(51) Int. Cl.
*H02J 13/00* (2006.01)
*H02J 3/32* (2006.01)
*G05B 15/02* (2006.01)
*H02J 3/38* (2006.01)

(52) U.S. Cl.
CPC .......... *H02J 13/0017* (2013.01); *G05B 15/02* (2013.01); *H02J 3/32* (2013.01); *H02J 3/383* (2013.01); *H02J 3/386* (2013.01)

(58) Field of Classification Search
None
See application file for complete search history.

(56) References Cited

U.S. PATENT DOCUMENTS

| | | | |
|---|---|---|---|
| 6,288,456 B1 * | 9/2001 | Cratty | H02J 3/005 307/64 |
| 6,633,823 B2 | 10/2003 | Bartone et al. | |
| 7,143,300 B2 | 11/2006 | Potter et al. | |
| 7,647,516 B2 | 1/2010 | Ranganathan et al. | |
| 7,702,931 B2 | 4/2010 | Goodrum et al. | |
| 7,779,276 B2 | 8/2010 | Bolan et al. | |
| 7,861,102 B1 | 12/2010 | Ranganathan et al. | |
| 7,921,315 B2 | 4/2011 | Langgood et al. | |
| 7,970,561 B2 | 6/2011 | Pfeiffer | |

(Continued)

FOREIGN PATENT DOCUMENTS

| | | |
|---|---|---|
| CN | 103163904 A | 6/2013 |
| KR | 20090012523 A | 2/2009 |
| WO | 2015/199629 | 12/2015 |

OTHER PUBLICATIONS

Wilson, Joseph, "A Utility-Scale Deployment Project of Behind-the-Meter Energy Storage for Use in Ancillary Services, Energy Resiliency, Grid Infrastructure Investment Deferment, and Demand-Response Integration", Portland State University, 2016 (Year: 2016).*

(Continued)

*Primary Examiner* — Carlos R Ortiz Rodriguez
(74) *Attorney, Agent, or Firm* — McDonnell Boehnen Hulbert & Berghoff LLP

(57) ABSTRACT

A system includes a flexible datacenter and a power generation unit that generates power on an intermittent basis. The flexible datacenter is coupled to both the power generation unit and grid power through a local station. By various methods, a control system may detect a transition of the power generation unit into a stand-down mode and selectively direct grid power delivery to always-on systems in the flexible datacenter.

20 Claims, 14 Drawing Sheets

(56) References Cited

U.S. PATENT DOCUMENTS

| | | | |
|---|---|---|---|
| 8,001,403 B2 * | 8/2011 | Hamilton | G06F 1/3203 713/300 |
| 8,006,108 B2 | 8/2011 | Brey et al. | |
| 8,214,843 B2 | 7/2012 | Boss et al. | |
| 8,374,928 B2 | 2/2013 | Gopisetty et al. | |
| 8,447,993 B2 | 5/2013 | Greene et al. | |
| 8,571,820 B2 | 10/2013 | Pfeiffer | |
| 8,627,123 B2 | 1/2014 | Jain et al. | |
| 8,700,929 B1 | 4/2014 | Weber et al. | |
| 8,789,061 B2 | 7/2014 | Pavel et al. | |
| 8,799,690 B2 | 8/2014 | Dawson et al. | |
| 9,003,211 B2 | 4/2015 | Pfeiffer | |
| 9,003,216 B2 | 4/2015 | Sankar et al. | |
| 9,026,814 B2 | 5/2015 | Aasheim et al. | |
| 9,207,993 B2 | 12/2015 | Jain | |
| 9,218,035 B2 | 12/2015 | Li et al. | |
| 9,552,234 B2 | 1/2017 | Boldyrev et al. | |
| 10,367,353 B1 | 7/2019 | McNamara et al. | |
| 10,367,535 B2 | 7/2019 | Corse et al. | |
| 10,444,818 B1 | 10/2019 | McNamara et al. | |
| 10,452,127 B1 | 10/2019 | McNamara et al. | |
| 10,497,072 B2 | 12/2019 | Hooshmand et al. | |
| 2003/0074464 A1 | 4/2003 | Bohrer et al. | |
| 2004/0117330 A1 | 6/2004 | Ehlers et al. | |
| 2005/0203761 A1 | 9/2005 | Barr et al. | |
| 2006/0161765 A1 | 7/2006 | Cromer et al. | |
| 2008/0030078 A1 | 2/2008 | Whitted et al. | |
| 2008/0094797 A1 | 4/2008 | Coglitore et al. | |
| 2009/0055665 A1 | 2/2009 | Maglione et al. | |
| 2009/0070611 A1 | 3/2009 | Bower, III et al. | |
| 2009/0089595 A1 | 4/2009 | Brey et al. | |
| 2010/0211810 A1 | 8/2010 | Zacho | |
| 2010/0328849 A1 | 12/2010 | Ewing et al. | |
| 2011/0072289 A1 | 3/2011 | Kato | |
| 2011/0238342 A1 | 9/2011 | Pfeiffer | |
| 2012/0000121 A1 | 1/2012 | Swann | |
| 2012/0072745 A1 | 3/2012 | Ahluwalia et al. | |
| 2012/0300524 A1 | 11/2012 | Fornage | |
| 2013/0006401 A1 | 1/2013 | Shan | |
| 2013/0063991 A1 | 3/2013 | Xiao et al. | |
| 2013/0086404 A1 | 4/2013 | Sankar et al. | |
| 2013/0187464 A1 | 7/2013 | Smith et al. | |
| 2013/0227139 A1 | 8/2013 | Suffling | |
| 2013/0306276 A1 | 11/2013 | Duchesneau | |
| 2014/0137468 A1 | 5/2014 | Ching | |
| 2014/0379156 A1 | 12/2014 | Kamel et al. | |
| 2015/0121113 A1 | 4/2015 | Ramamurthy et al. | |
| 2015/0155712 A1 | 6/2015 | Mondal | |
| 2015/0229227 A1 | 8/2015 | Aeloiza et al. | |
| 2015/0277410 A1 | 10/2015 | Gupta et al. | |
| 2015/0278968 A1 | 10/2015 | Steven et al. | |
| 2016/0170469 A1 | 6/2016 | Sehgal et al. | |
| 2016/0172900 A1 | 6/2016 | Welch, Jr. | |
| 2016/0187906 A1 | 6/2016 | Bodas et al. | |
| 2016/0198656 A1 | 7/2016 | McNamara et al. | |
| 2016/0212954 A1 | 7/2016 | Argento | |
| 2016/0324077 A1 | 11/2016 | Frantzen et al. | |
| 2017/0023969 A1 | 1/2017 | Shows et al. | |
| 2017/0104336 A1 | 4/2017 | Eibsat et al. | |
| 2017/0261949 A1 | 9/2017 | Hoffmann et al. | |
| 2018/0144414 A1 | 5/2018 | Lee et al. | |
| 2018/0202825 A1 | 7/2018 | You et al. | |
| 2018/0240112 A1 | 8/2018 | Castinado et al. | |
| 2018/0366978 A1 | 12/2018 | Matan et al. | |
| 2018/0367320 A1 | 12/2018 | Montalvo | |
| 2019/0052094 A1 | 2/2019 | Pmsvvsv et al. | |
| 2019/0168630 A1 | 6/2019 | Mrlik et al. | |
| 2019/0258307 A1 | 8/2019 | Shaikh et al. | |
| 2019/0280521 A1 | 9/2019 | Lundstrom et al. | |
| 2019/0318327 A1 | 10/2019 | Sowell et al. | |
| 2019/0324820 A1 | 10/2019 | Krishnan et al. | |

OTHER PUBLICATIONS

Bird et al., "Wind and Solar Energy Curtailment: Experience and Practices in the United States," NREL, Technical Report NREL/TP-6A20-60983, Mar. 2014, 58 pages.

EPEX Spot, "How They Occur, What They Mean," https://www.epexspot.com/en/company-info/basics_of_the_power_market/negative_prices, 2018, 2 pages.

International Searching Authority, International Search Report and Written Opinion, dated May 31, 2018, issued in connection with International Patent Application No. PCT/US2018/017950, filed on Feb. 13, 2018, 15 pages.

International Searching Authority, International Search Report and Written Opinion, dated Apr. 30, 2018, issued in connection with International Patent Application No. PCT/US2018/017955, filed on Feb. 13, 2018, 22 pages.

Soluna, Powering the Blockchain, Aug. 2018, Verison 1.1, 29 pages.

Notice of Allowance dated Apr. 2, 2019, for U.S. Appl. No. 16/175,335, filed Oct. 30, 2018, 12 pages.

Notice of Allowance dated Jul. 29, 2019, for U.S. Appl. No. 16/245,532, filed Jan. 11, 2019, 13 pages.

Co-pending U.S. Appl. No. 16/132,092, filed Sep. 14, 2018.

Co-pending U.S. Appl. No. 16/482,495, filed Jul. 31, 2019.

Ghamkhari et al., "Optimal Integration of Renewable Energy Resources in Data Centers with Behind-the-Meter Renewable Generator," Department of Electrical and Computer Engineering Texas Tech University, 2012, pp. 3340-3444.

Non-Final Office Action dated Dec. 5, 2019 for U.S. Appl. No. 16/529,360, filed Aug. 1, 2019, 72 pages.

Non-Final Office Action dated Dec. 10, 2019 for U.S. Appl. No. 16/596,190, filed Oct. 8, 2019, 72 pages.

Non-Final Office Action dated Nov. 14, 2019 for U.S. Appl. No. 16/132,098, filed Sep. 14, 2018, 25 pages.

Non-Final Office Action dated Nov. 21, 2019 for U.S. Appl. No. 16/529,402, filed Aug. 1, 2019, 57 pages.

Non-Final Office Action dated Dec. 11, 2019 on for U.S. Appl. No. 16/132,062, filed Sep. 14, 2018, 17 pages.

Non-Final Office Action dated Dec. 10, 2019 for U.S. Appl. No. 16/528,348, filed Oct. 8, 2019, 33 pages.

Notice of Allowance dated Aug. 15, 2019, for U.S. Appl. No. 16/175,146, filed Oct. 30, 2018, 17 pages.

Notice of Allowance dated Jan. 27, 2020, for U.S. Appl. No. 16/702,931, filed Dec. 4, 2019, 23 pages.

Rahimi, Farrokh, "Using a Transactive Energy Framework," IEEE Electrification Magazine, Dec. 2016, pp. 23-29.

Final Office Action dated Apr. 17, 2020 for U.S. Appl. No. 16/529,402, filed Aug. 1, 2019, 59 pages.

Hayes, Adam S., "A Cost of Production Model for Bitcoin," Department of Economics, The New School for Social Research, Mar. 2015, 5 pages.

Non-Final Office Action dated Feb. 20, 2020 for U.S. Appl. No. 16/702,894, filed Dec. 4, 2019, 30 pages.

Non-Final Office Action dated Apr. 2, 2020 on for U.S. Appl. No. 16/132,011, filed Sep. 14, 2018, 5 pages.

Non-Final Office Action dated Mar. 30, 2020 for U.S. Appl. No. 16/132,092, filed Sep. 14, 2018, 46 pages.

Notice of Allowance dated Mar. 2, 2020, for U.S. Appl. No. 16/596,190, filed Oct. 8, 2019, 15 pages.

* cited by examiner

SYSTEMS AND METHODS FOR AUXILIARY POWER MANAGEMENT OF BEHIND-THE-METER POWER LOADS

FIELD OF THE INVENTION

This specification relates to a system for controlling the use of "behind-the-meter" power.

BACKGROUND OF THE INVENTION

The price for power distributed through regional and national electric power grids is composed of Generation, Administration, and Transmission & Distribution ("T&D") costs. T&D costs are a significant portion of the overall price paid by consumers for electricity. T&D costs include capital costs (land, equipment, substations, wire, etc.), electrical transmission losses, and operation and maintenance costs. Electrical power is typically generated at local stations (e.g., coal, natural gas, nuclear, and renewable sources) in the Medium Voltage class of 2.4 kVAC to 69 kVAC before being converted in an AC-AC step up transformer to High Voltage at 115 kVAC or above. T&D costs are accrued at the point the generated power leaves the local station and is converted to High Voltage electricity for transmission onto the grid.

Local station operators are paid a variable market price for the amount of power leaving the local station and entering the grid. However, grid stability requires that a balance exist between the amount of power entering the grid and the amount of power used from the grid. Grid stability and congestion is the responsibility of the grid operator and grid operators take steps, including curtailment, to reduce power supply from local stations when necessary. Frequently, the market price paid for generated power will be decreased in order to disincentivize local stations from generating power. In some cases, the market price will go negative, resulting in a cost to local station operators who continue to supply power onto a grid. Grid operators may sometimes explicitly direct a local station operator to reduce or stop the amount of power the local station is supplying to the grid.

Power market fluctuations, power system conditions such as power factor fluctuation or local station startup and testing, and operational directives resulting in reduced or discontinued generation all can have disparate effects on renewal energy generators and can occur multiple times in a day and last for indeterminate periods of time. Curtailment, in particular, is particularly problematic.

According to the National Renewable Energy Laboratory's Technical Report TP-6A20-60983 (March 2014):

[C]urtailment [is] a reduction in the output of a generator from what it could otherwise produce given available resources (e.g., wind or sunlight), typically on an involuntary basis. Curtailments can result when operators or utilities command wind and solar generators to reduce output to minimize transmission congestion or otherwise manage the system or achieve the optimal mix of resources. Curtailment of wind and solar resources typically occurs because of transmission congestion or lack of transmission access, but it can also occur for reasons such as excess generation during low load periods that could cause baseload generators to reach minimum generation thresholds, because of voltage or interconnection issues, or to maintain frequency requirements, particularly for small, isolated grids. Curtailment is one among many tools to maintain system energy balance, which can also include grid capacity, hydropower and thermal generation, demand response, storage, and institutional changes. Deciding which method to use is primarily a matter of economics and operational practice.

"Curtailment" today does not necessarily mean what it did in the early 2000s. Two sea changes in the electric sector have shaped curtailment practices since that time: the utility-scale deployment of wind power, which has no fuel cost, and the evolution of wholesale power markets. These simultaneous changes have led to new operational challenges but have also expanded the array of market-based tools for addressing them.

Practices vary significantly by region and market design. In places with centrally-organized wholesale power markets and experience with wind power, manual wind energy curtailment processes are increasingly being replaced by transparent offer-based market mechanisms that base dispatch on economics. Market protocols that dispatch generation based on economics can also result in renewable energy plants generating less than what they could potentially produce with available wind or sunlight. This is often referred to by grid operators by other terms, such as "downward dispatch." In places served primarily by vertically integrated utilities, power purchase agreements (PPAs) between the utility and the wind developer increasingly contain financial provisions for curtailment contingencies.

Some reductions in output are determined by how a wind operator values dispatch versus non-dispatch. Other curtailments of wind are determined by the grid operator in response to potential reliability events. Still other curtailments result from overdevelopment of wind power in transmission-constrained areas.

Dispatch below maximum output (curtailment) can be more of an issue for wind and solar generators than it is for fossil generation units because of differences in their cost structures. The economics of wind and solar generation depend on the ability to generate electricity whenever there is sufficient sunlight or wind to power their facilities. Because wind and solar generators have substantial capital costs but no fuel costs (i.e., minimal variable costs), maximizing output improves their ability to recover capital costs. In contrast, fossil generators have higher variable costs, such as fuel costs. Avoiding these costs can, depending on the economics of a specific generator, to some degree reduce the financial impact of curtailment, especially if the generator's capital costs are included in a utility's rate base.

Curtailment may result in available energy being wasted (which may not be true to the same extent for fossil generation units which can simply reduce the amount of fuel that is being used). With wind generation, in particular, it may also take some time for a wind farm to become fully operational following curtailment. As such, until the time that the wind farm is fully operational, the wind farm may not be operating with optimum efficiency and/or may not be able to provide power to the grid.

BRIEF SUMMARY OF THE INVENTION

In one embodiment, a system includes a first power source comprising a power generation unit. The power generation unit generates behind-the-meter power on an intermittent basis, and a second power source. The system also includes a flexible datacenter. The flexible datacenter comprises a behind-the-meter power input system configured to receive power from (i) the first power source as behind-the-meter power, and (ii) the second power source and a set of always-on systems. The flexible datacenter also comprises a plurality of computing systems configured to carry out computational operations, and a datacenter control system. The system also includes a first control system configured to selectively direct power to the behind-the-meter power input system from at least one of the first power source and the second power source, such that the set of always-on systems receives continuous power from the behind-the-meter power input system. The first control system is configured to selectively direct power based on one or more monitored power system conditions.

In another embodiment, a method includes detecting a first indication that an intermittent power generation unit is or will be transitioning to a stand-down mode from a power generation mode. The intermittent power generation unit generates power during the power generation mode and does not generate power during the stand-down mode. In addition, the intermittent power generation unit supplies the generated power as behind-the-meter power to a flexible datacenter comprising a datacenter control system and a plurality of computing systems configured to perform computational operations. The method further includes, based on detecting the first indication, responsively: (a) selecting an alternate power source for power delivery to at least one of the computing systems of the plurality of computing systems, and (b) enabling power delivery from the selected alternate power source to the at least one computing system.

In a further embodiment, a method includes detecting a first indication that an intermittent power generation unit is or will be transitioning to a stand-down mode from a power generation mode. The intermittent power generation unit generates power during the power generation mode and does not generate power during the stand-down mode. The intermittent power generation unit supplies the generated power as behind-the-meter power to a flexible datacenter comprising a datacenter control system and a plurality of computing systems configured to perform computational operations. The method further includes, based on detecting the first indication, responsively: (a) selecting an alternate power source for power delivery to the datacenter control system, and (b) enabling power delivery from the selected alternate power source to the datacenter control system.

Other aspects of the present invention will be apparent from the following description and claims.

DETAILED DESCRIPTION OF THE INVENTION

Figure 1:
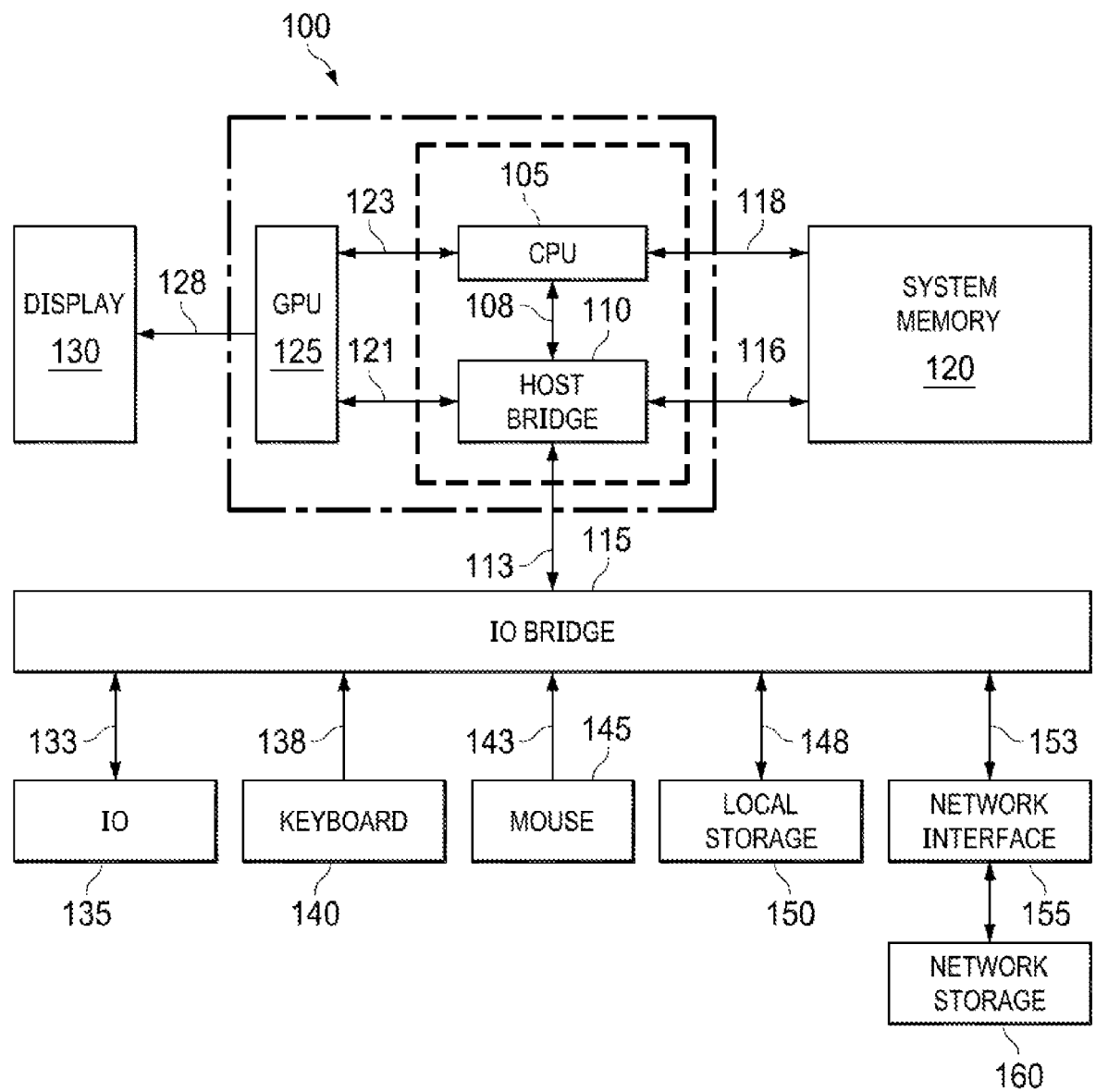
FIG. 1 shows a computing system in accordance with one or more embodiments of the present invention.

One or more embodiments of the present invention are described in detail with reference to the accompanying figures. For consistency, like elements in the various figures are denoted by like reference numerals. In the following detailed description of the present invention, specific details are set forth in order to provide a thorough understanding of the present invention. In other instances, well-known features to one having ordinary skill in the art are not described to avoid obscuring the description of the present invention.

The embodiments provided herein relate to providing an electrical load "behind the meter" at local stations such that generated power can be directed to the behind-the-meter load instead of, or in addition to, onto the grid, typically for intermittent periods of time. "Behind-the-meter" power includes power that is received from a power generation system (for instance, but not limited to, a wind or solar power generation system) prior to the power undergoing step-up transformation to High Voltage class AC power for transmission to the grid. Behind-the-meter power may therefore include power drawn directly from an intermittent grid-scale power generation system (e.g. a wind farm or a solar array) and not from the grid.

The embodiments herein provide an advantage when, for example, the power system conditions exhibit excess local power generation at a local station level, excess local power generation that a grid cannot receive, local power generation that is subject to economic curtailment, local power generation that is subject to reliability curtailment, local power generation that is subject to power factor correction, low local power generation, start up local power generation situations, transient local power generation situations, conditions where the cost for power is economically viable (e.g., low cost for power), or testing local power generation situations where there is an economic advantage to using local behind-the-meter power generation. This is not least because the excess power can be utilized by the behind-the-meter electrical load rather than going to waste. In addition, by providing an electrical load behind-the-meter rather than connected to the grid, electrical transmission losses resulting from transmission of power through the grid can be reduced. In addition, any degradation in the power generation systems which may result from curtailment may be reduced.

Preferably, controlled computing systems that consume electrical power through computational operations can provide a behind-the-meter electrical load that can be granularly ramped up and down quickly under the supervision of control systems that monitor power system conditions and direct the power state and/or computational activity of the computing systems. In one embodiment, the computing systems preferably receive all their power for supervisory and communication systems, and computational operations, from a behind-the-meter power source. In another embodiment, the computing systems may additionally include a connection to grid power for supervisory and communication systems or other ancillary needs. In yet another embodiment, the computing systems can be configured to switch between behind-the-meter power and grid power or another power source under the direction of a control system.

Among other benefits, a computing system load with controlled granular ramping allows a local station to avoid negative power market pricing and to respond quickly to grid directives. Local stations may include a station capable of controlling power direction and supply and may be referred to as substations or station controls.

Various computing systems can provide granular behind-the-meter ramping. Preferably the computing systems perform computational tasks that are immune to, or not substantially hindered by, frequent interruptions or slow-downs in processing as the computing systems ramp up and down. In one embodiment, control systems can activate or de-activate one or more computing systems in an array of similar or identical computing systems sited behind the meter. For example, one or more blockchain miners, or groups of blockchain miners, in an array may be turned on or off. In another embodiment, control systems can direct time-insensitive computational tasks to computational hardware, such as CPUs and GPUs, sited behind the meter, while other hardware is sited in front of the meter and possibly remote from the behind-the-meter hardware. Any parallel computing processes, such as Monte Carlo simulations, batch processing of financial transactions, graphics rendering, and oil and gas field simulation models are all good candidates for such interruptible computational operations.

In some embodiments, an intermittent power generation system includes one or more intermittent power generation units, such as a wind farm with one or more wind turbines, where the intermittent power generation units act individually or collectively as a behind-the-meter power source that supplies behind-the-meter power to one or more flexible datacenters via a behind-the-meter power input system and a behind-the-meter power distribution system at each flexible datacenter. Within each flexible datacenter, the behind-the-meter power may power computing systems, climate control systems, and datacenter control systems. The intermittent power generation units, and/or the intermittent power generation system as a whole, may alternate between a power generation mode and a stand-down mode. When in stand-down mode, the power generation units are unable to supply sufficient behind-the-meter power to partially or fully operate one or more flexible datacenters that receive behind-the-meter power from the power generation units. The power generation units may enter stand-down mode for numerous reasons, including but not limited to a reduction in a power generating resource (e.g., wind or sun), a directive from the grid operator related to grid conditions, economic conditions, maintenance and/or an emergency.

In some scenarios, one or more flexible datacenters connected to intermittent power generation unit(s) may shut down entirely when one or more of the power generation unit(s) enter stand-down mode. However, in some embodiments, the systems and methods disclosed herein may enable one or more systems within the flexible datacenter(s) to be designated as always-on and to continue operating despite the loss of behind-the-meter power. For example, it may be desirable to continue operating the flexible datacenter control system, supervisory and communication systems related to or included in the flexible datacenter control system, climate control systems in the flexible datacenter, and/or individual or groups of computing systems in the flexible datacenter that need to continue and/or finish computational operations. The computing systems may include various types of computing devices, such as individual processors, servers, etc.

To ensure that these always-on systems continue to receive power despite the change in operational mode of the intermittent power generation unit, a control system may selectively direct power from one or more alternate power sources to supply power to the always-on systems in one or more of the flexible datacenters receiving power from the intermittent power generation unit. For example, a remote master control system, a datacenter control system, a local station control system, or another computing system may selectively direct grid power, preferably from a location station, to one or more power input systems within one or more of the flexible datacenters, such that the always-on systems switch from receiving behind-the-meter power to receiving grid power. In some embodiments, the remote master control system or the flexible datacenter control system may direct power to always-on systems within one or more of the flexible datacenters from one or more power sources, such as the power grid, an energy storage system, or a different behind-the-meter power generation unit. Advantageously, always-on systems within the flexible datacenters may maintain communication with other remote systems, ramp up computational operations and load faster because cold startup is eliminated, maintain climate temperatures within define parameters, and/or continue to perform (or finish) critical computational operations, such as distributed computing processes (e.g., blockchain hashing operations) or simulations without disruption.

In some embodiments, one or more flexible datacenters may perform computing processes obtained through an auction process. The one or more flexible datacenters may use behind-the-meter power to acquire and perform computational operations made available via the auction process. For example, an auction process may be used to connect companies or entities requesting computational operations to be supported and performed at one or more datacenters with datacenters capable of handling the computational operations. Particularly, the auction process may involve datacenters placing bids in a competition for the various computational operations available in the auction process. For instance, the datacenter that bids to perform a computational operation at the lowest cost may win and receive the right to enter into a contract to perform the computational for the priced bid or subsequently agreed upon. As such, flexible datacenters may compete and receive the right to perform computational operations by bidding prices based on using low cost power, such as behind-the-meter power. A datacenter control system of a flexible datacenter may monitor available computational operations in multiple auctions simultaneously to determine when to bid for computational operations based on the cost of power available and competing bids.

FIG. 1 shows a computing system 100 in accordance with one or more embodiments of the present invention. Computing system 100 may include one or more central processing units (singular "CPU" or plural "CPUs") 105, host bridge 110, input/output ("IO") bridge 115, graphics processing units (singular "GPU" or plural "GPUs") 125, and/or application-specific integrated circuits (singular "ASIC or plural "ASICs") (not shown) disposed on one or more printed circuit boards (not shown) that are configured to perform computational operations. Each of the one or more CPUs 105, GPUs 125, or ASICs (not shown) may be a single-core (not independently illustrated) device or a multi-core (not independently illustrated) device. Multi-core devices typically include a plurality of cores (not shown) disposed on the same physical die (not shown) or a plurality of cores (not shown) disposed on multiple die (not shown) that are collectively disposed within the same mechanical package (not shown).

CPU 105 may be a general purpose computational device typically configured to execute software instructions. CPU 105 may include an interface 108 to host bridge 110, an interface 118 to system memory 120, and an interface 123 to one or more IO devices, such as, for example, one or more GPUs 125. GPU 125 may serve as a specialized computational device typically configured to perform graphics functions related to frame buffer manipulation. However, one of ordinary skill in the art will recognize that GPU 125 may be used to perform non-graphics related functions that are computationally intensive. In certain embodiments, GPU 125 may interface 123 directly with CPU 125 (and interface 118 with system memory 120 through CPU 105). In other embodiments, GPU 125 may interface 121 with host bridge 110 (and interface 116 or 118 with system memory 120 through host bridge 110 or CPU 105 depending on the application or design). In still other embodiments, GPU 125 may interface 133 with IO bridge 115 (and interface 116 or 118 with system memory 120 through host bridge 110 or CPU 105 depending on the application or design). The functionality of GPU 125 may be integrated, in whole or in part, with CPU 105.

Host bridge 110 may be an interface device configured to interface between the one or more computational devices and IO bridge 115 and, in some embodiments, system memory 120. Host bridge 110 may include an interface 108 to CPU 105, an interface 113 to IO bridge 115, for embodiments where CPU 105 does not include an interface 118 to system memory 120, an interface 116 to system memory 120, and for embodiments where CPU 105 does not include an integrated GPU 125 or an interface 123 to GPU 125, an interface 121 to GPU 125. The functionality of host bridge 110 may be integrated, in whole or in part, with CPU 105. IO bridge 115 may be an interface device configured to interface between the one or more computational devices and various IO devices (e.g., 140, 145) and IO expansion, or add-on, devices (not independently illustrated). IO bridge 115 may include an interface 113 to host bridge 110, one or more interfaces 133 to one or more IO expansion devices 135, an interface 138 to keyboard 140, an interface 143 to mouse 145, an interface 148 to one or more local storage devices 150, and an interface 153 to one or more network interface devices 155. The functionality of IO bridge 115 may be integrated, in whole or in part, with CPU 105 or host bridge 110. Each local storage device 150, if any, may be a solid-state memory device, a solid-state memory device array, a hard disk drive, a hard disk drive array, or any other non-transitory computer readable medium. Network interface device 155 may provide one or more network interfaces including any network protocol suitable to facilitate networked communications.

Computing system 100 may include one or more network-attached storage devices 160 in addition to, or instead of, one or more local storage devices 150. Each network-attached storage device 160, if any, may be a solid-state memory device, a solid-state memory device array, a hard disk drive, a hard disk drive array, or any other non-transitory computer readable medium. Network-attached storage device 160 may or may not be collocated with computing system 100 and may be accessible to computing system 100 via one or more network interfaces provided by one or more network interface devices 155.

One of ordinary skill in the art will recognize that computing system 100 may be a conventional computing system or an application-specific computing system. In certain embodiments, an application-specific computing system may include one or more ASICs (not shown) that are configured to perform one or more functions, such as distributed computing processes, in a more efficient manner. The one or more ASICs (not shown) may interface directly with CPU 105, host bridge 110, or GPU 125 or interface through IO bridge 115. Alternatively, in other embodiments, an application-specific computing system may be reduced to only those components necessary to perform a desired function in an effort to reduce one or more of chip count, printed circuit board footprint, thermal design power, and power consumption. The one or more ASICs (not shown) may be used instead of one or more of CPU 105, host bridge 110, IO bridge 115, or GPU 125. In such systems, the one or more ASICs may incorporate sufficient functionality to perform certain network and computational functions in a minimal footprint with substantially fewer component devices.

As such, one of ordinary skill in the art will recognize that CPU 105, host bridge 110, JO bridge 115, GPU 125, or ASIC (not shown) or a subset, superset, or combination of functions or features thereof, may be integrated, distributed, or excluded, in whole or in part, based on an application, design, or form factor in accordance with one or more embodiments of the present invention. Thus, the description of computing system 100 is merely exemplary and not intended to limit the type, kind, or configuration of component devices that constitute a computing system 100 suitable for performing computing operations in accordance with one or more embodiments of the present invention.

One of ordinary skill in the art will recognize that computing system 100 may be a stand alone, laptop, desktop, server, blade, or rack mountable system and may vary based on an application or design.

Figure 2:
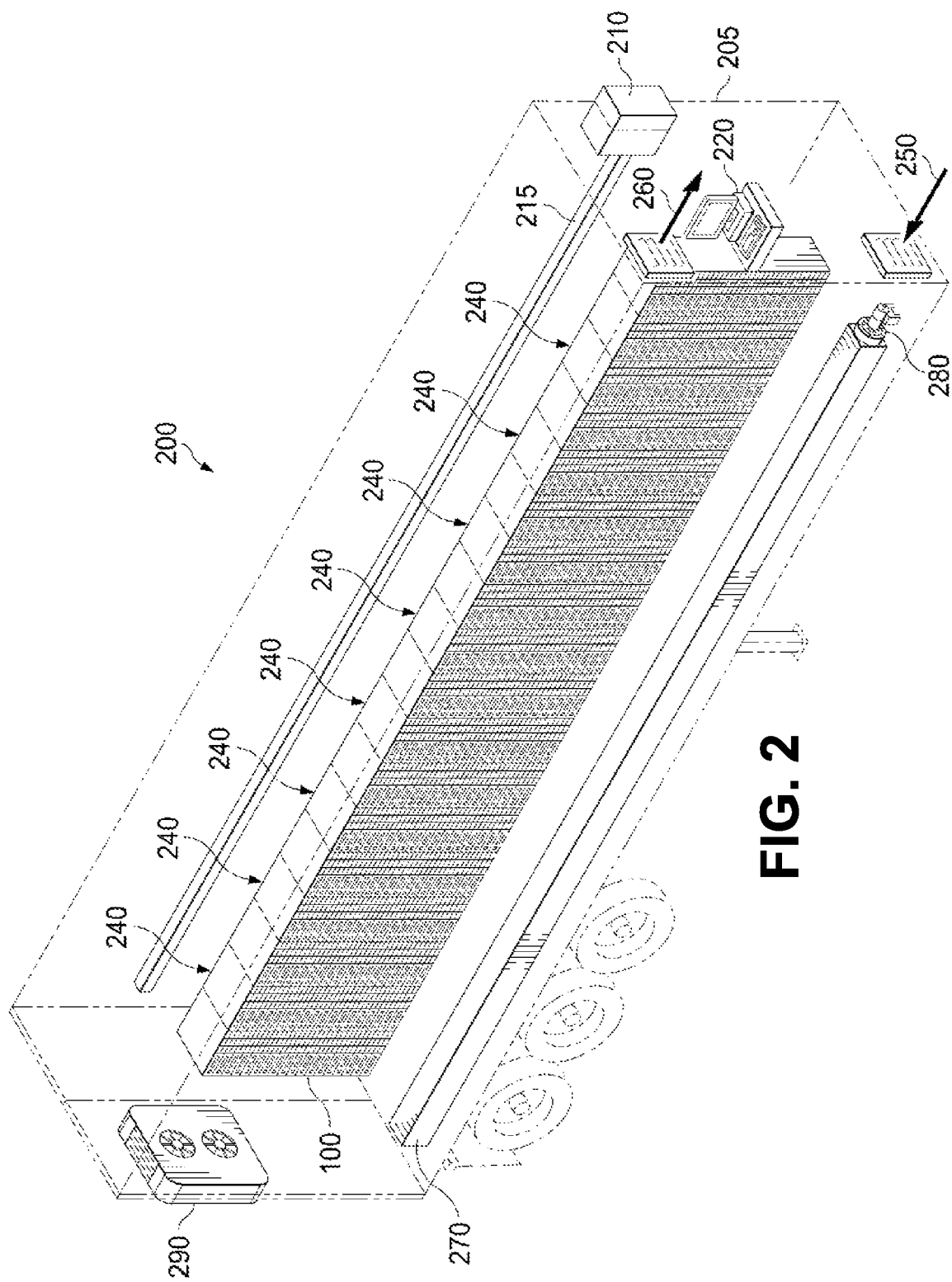
FIG. 2 shows a flexible datacenter in accordance with one or more embodiments of the present invention.

FIG. 2 shows a flexible datacenter 200 in accordance with one or more embodiments of the present invention. Flexible datacenter 200 may include a mobile container 205, a behind-the-meter power input system 210, a power distribution system 215, a climate control system (e.g., 250, 260, 270, 280, and/or 290), a datacenter control system 220, and a plurality of computing systems 100 disposed in one or more racks 240. Datacenter control system 220 may be a computing system (e.g., 100 of FIG. 1) configured to dynamically modulate power delivery to one or more computing systems 100 disposed within flexible datacenter 200 based on behind-the-meter power availability or an operational directive from a local station control system (not shown), a remote master control system (not shown), or a grid operator (not shown).

In certain embodiments, mobile container 205 may be a storage trailer disposed on wheels and configured for rapid deployment. In other embodiments, mobile container 205 may be a storage container (not shown) configured for placement on the ground and potentially stacked in a vertical manner (not shown). In still other embodiments, mobile container 205 may be an inflatable container, a floating container, or any other type or kind of container suitable for housing a mobile datacenter 200. And in still other embodiments, flexible datacenter 200 might not include a mobile container. For example, flexible datacenter 200 may be situated within a building or another type of stationary environment.

Flexible datacenter 200 may be rapidly deployed on site near a source of behind-the-meter power generation. Behind-the-meter power input system 210 may be configured to input power to flexible datacenter 200. Behind-the-meter power input system 210 may include a first input (not independently illustrated) configured to receive three-phase behind-the-meter alternating current ("AC") voltage. In certain embodiments, behind-the-meter power input system 210 may include a supervisory AC-to-AC step-down transformer (not shown) configured to step down three-phase behind-the-meter AC voltage to single-phase supervisory nominal AC voltage or a second input (not independently illustrated) configured to receive single-phase supervisory nominal AC voltage from the local station (not shown) or a metered source (not shown). Behind-the-meter power input system 210 may provide single-phase supervisory nominal AC voltage to datacenter control system 220, which may remain powered at almost all times to control the operation of flexible datacenter 200. The first input (not independently illustrated) or a third input (not independently illustrated) of behind-the-meter power input system 210 may direct three-phase behind-the-meter AC voltage to an operational AC-to-AC step-down transformer (not shown) configured to controllably step down three-phase behind-the-meter AC voltage to three-phase nominal AC voltage. Datacenter control system 220 may controllably enable or disable generation or provision of three-phase nominal AC voltage by the operational AC-to-AC step-down transformer (not shown).

Behind-the-meter power input system 210 may provide three phases of three-phase nominal AC voltage to power distribution system 215. Power distribution system 215 may controllably provide a single phase of three-phase nominal AC voltage to each computing system 100 or group 240 of computing systems 100 disposed within flexible datacenter 200. Datacenter control system 220 may controllably select which phase of three-phase nominal AC voltage that power distribution system 215 provides to each computing system 100 or group 240 of computing systems 100. In this way, datacenter control system 220 may modulate power delivery by either ramping-up flexible datacenter 200 to fully operational status, ramping-down flexible datacenter 200 to offline status (where only datacenter control system 220 remains powered), reducing power consumption by withdrawing power delivery from, or reducing power to, one or more computing systems 100 or groups 240 of computing systems 100, or modulating a power factor correction factor for the local station by controllably adjusting which phases of three-phase nominal AC voltage are used by one or more computing systems 100 or groups 240 of computing systems 100. In some embodiments, flexible datacenter 20¬0 may receive DC power to power computing systems 100.

Flexible datacenter 200 may include a climate control system (e.g., 250, 260, 270, 280, 290) configured to maintain the plurality of computing systems 100 within their operational temperature range. In certain embodiments, the climate control system may include an air intake 250, an evaporative cooling system 270, a fan 280, and an air outtake 260. In other embodiments, the climate control system may include an air intake 250, an air conditioner or refrigerant cooling system 290, and an air outtake 260. In still other embodiments, the climate control system may include a computer room air conditioner system (not shown), a computer room air handler system (not shown), or an immersive cooling system (not shown). One of ordinary skill in the art will recognize that any suitable heat extraction system (not shown) configured to maintain the operation of the plurality of computing systems 100 within their operational temperature range may be used in accordance with one or more embodiments of the present invention.

Flexible datacenter 200 may include a battery system (not shown) configured to convert three-phase nominal AC voltage to nominal DC voltage and store power in a plurality of storage cells. The battery system (not shown) may include a DC-to-AC inverter configured to convert nominal DC voltage to three-phase nominal AC voltage for flexible datacenter 200 use. Alternatively, the battery system (not shown) may include a DC-to-AC inverter configured to convert nominal DC voltage to single-phase nominal AC voltage to power datacenter control system 220.

One of ordinary skill in the art will recognize that a voltage level of three-phase behind-the-meter AC voltage may vary based on an application or design and the type or kind of local power generation. As such, a type, kind, or configuration of the operational AC-to-AC step down transformer (not shown) may vary based on the application or design. In addition, the frequency and voltage level of three-phase nominal AC voltage, single-phase nominal AC voltage, and nominal DC voltage may vary based on the application or design in accordance with one or more embodiments of the present invention.

Figure 3:
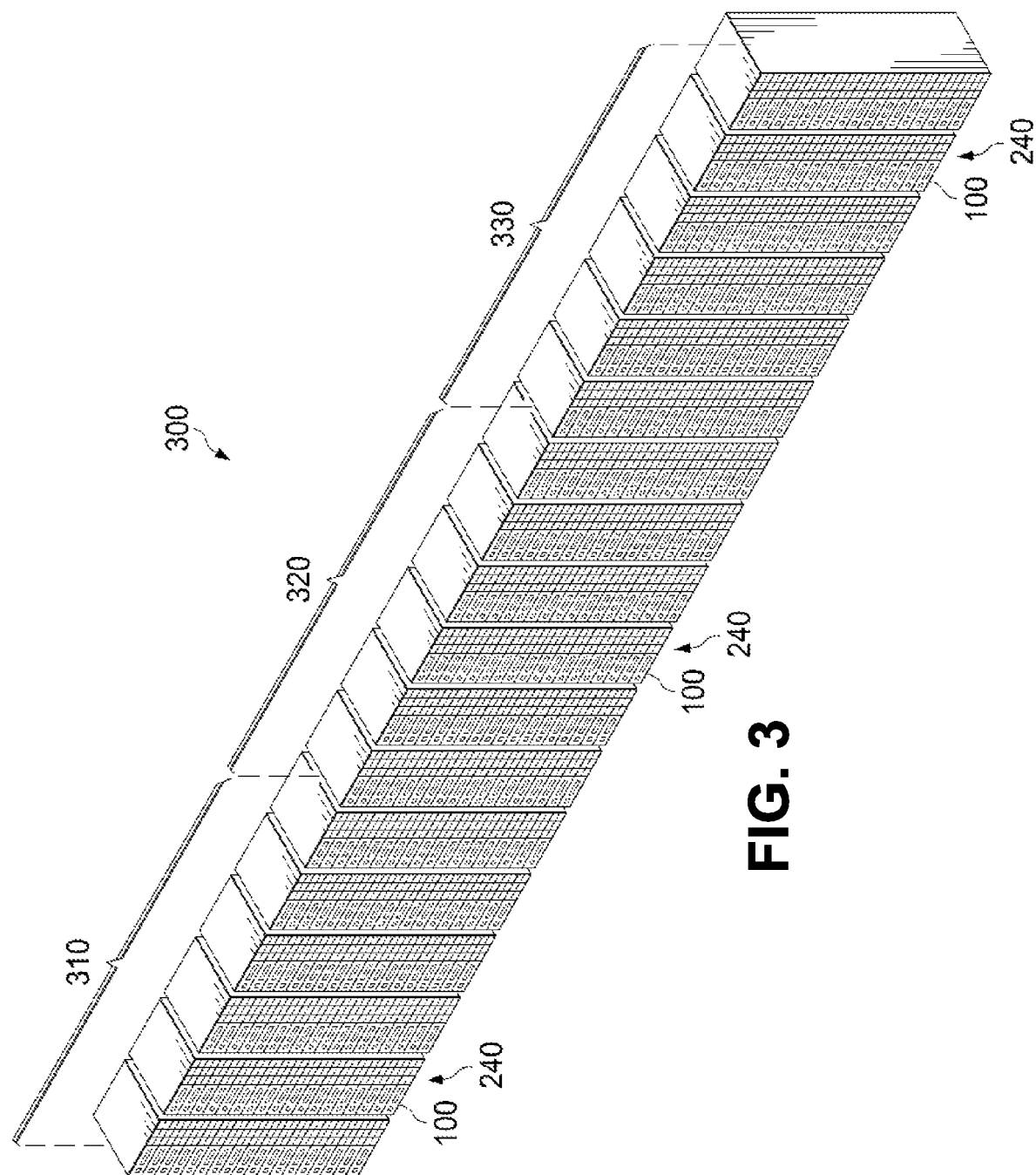
FIG. 3 shows a three-phase power distribution of a flexible datacenter in accordance with one or more embodiments of the present invention.

FIG. 3 shows a three-phase power distribution of a flexible datacenter 200 in accordance with one or more embodiments of the present invention. Flexible datacenter 200 may include a plurality of racks 240, each of which may include one or more computing systems 100 disposed therein. As discussed above, the behind-the-meter power input system (210 of FIG. 2) may provide three phases of three-phase nominal AC voltage to the power distribution system (215 of FIG. 2). The power distribution system (215 of FIG. 2) may controllably provide a single phase of three-phase nominal AC voltage to each computing system 100 or group 240 of computing systems 100 disposed within flexible datacenter 200. For example, a flexible datacenter 200 may include eighteen racks 240, each of which may include eighteen computing systems 100. The power distribution system (215 of FIG. 2) may control which phase of three-phase nominal AC voltage is provided to one or more computing systems 100, a rack 240 of computing systems 100, or a group (e.g., 310, 320, or 330) of racks 240 of computing systems 100.

In the figure, for purposes of illustration only, eighteen racks 240 are divided into a first group of six racks 310, a second group of six racks 320, and a third group of six racks 330, where each rack contains eighteen computing systems 100. The power distribution system (215 of FIG. 2) may, for example, provide a first phase of three-phase nominal AC voltage to the first group of six racks 310, a second phase of three-phase nominal AC voltage to the second group of six racks 320, and a third phase of three-phase nominal AC voltage to the third group of six racks 330. If the flexible datacenter (200 of FIG. 2) receives an operational directive from the local station (not shown) to provide power factor correction, the datacenter control system (220 of FIG. 2) may direct the power distribution system (215 of FIG. 2) to adjust which phase or phases of three-phase nominal AC voltage are used to provide the power factor correction required by the local station (not shown) or grid operator (not shown). One of ordinary skill in the art will recognize that, in addition to the power distribution, the load may be varied by adjusting the number of computing systems 100 operatively powered. As such, the flexible datacenter (200 of FIG. 2) may be configured to act as a capacitive or inductive load to provide the appropriate reactance necessary to achieve the power factor correction required by the local station (not shown).

Figure 4:
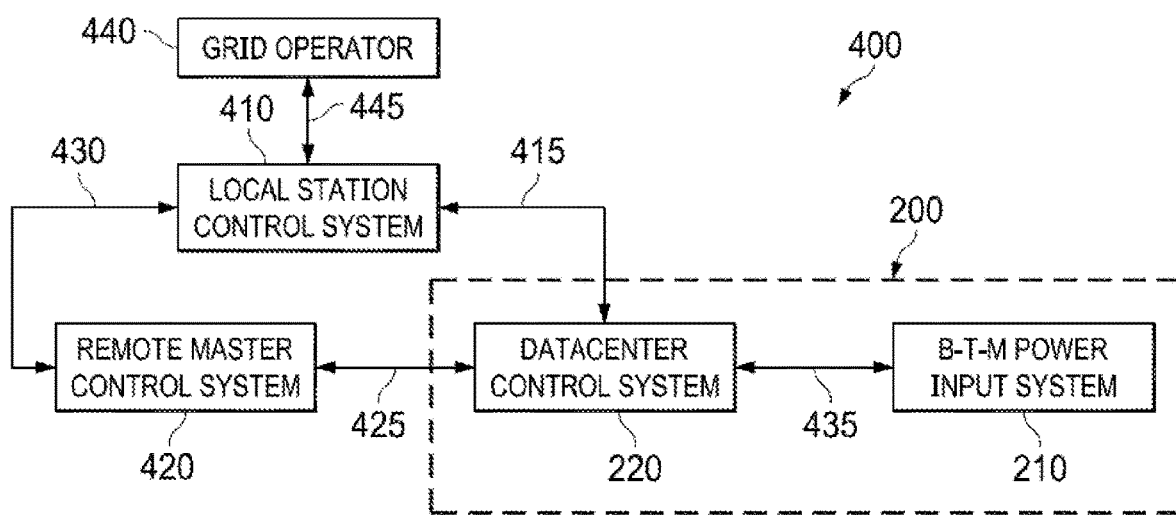
FIG. 4 shows a control distribution scheme of a flexible datacenter in accordance with one or more embodiments of the present invention.

FIG. 4 shows a control distribution scheme 400 of a flexible datacenter 200 in accordance with one or more embodiments of the present invention. Datacenter control system 220 may independently, or cooperatively with one or more of local station control system 410, remote master control system 420, and grid operator 440, modulate power delivery to flexible datacenter 200. Specifically, power delivery may be dynamically adjusted based on conditions or operational directives.

Local station control system 410 may be a computing system (e.g., 100 of FIG. 1) that is configured to control various aspects of the local station (not independently illustrated) that generates power and sometimes generates unutilized behind-the-meter power. Local station control system 410 may communicate with remote master control system 420 over a networked connection 430 and with datacenter control system 220 over a networked or hardwired connection 415. Remote master control system 420 may be a computing system (e.g., 100 of FIG. 1) that is located offsite, but connected via a network connection 425 to datacenter control system 220, that is configured to provide supervisory or override control of flexible datacenter 200 or a fleet (not shown) of flexible datacenters 200. Grid operator 440 may be a computing system (e.g., 100 of FIG. 1) that is configured to control various aspects of the grid (not independently illustrated) that receives power from the local station (not independently illustrated). Grid operator 440 may communicate with local station control system 440 over a networked or hardwired connection 445.

Datacenter control system 220 may monitor unutilized behind-the-meter power availability at the local station (not independently illustrated) and determine when a datacenter ramp-up condition is met. Unutilized behind-the-meter power availability may include one or more of excess local power generation, excess local power generation that the grid cannot accept, local power generation that is subject to economic curtailment, local power generation that is subject to reliability curtailment, local power generation that is subject to power factor correction, conditions where the cost for power is economically viable (e.g., low cost for power), situations where local power generation is prohibitively low, start up situations, transient situations, or testing situations where there is an economic advantage to using locally generated behind-the-meter power generation, specifically power available at little to no cost and with no associated transmission or distribution losses or costs.

The datacenter ramp-up condition may be met if there is sufficient behind-the-meter power availability and there is no operational directive from local station control system 410, remote master control system 420, or grid operator 440 to go offline or reduce power. As such, datacenter control system 220 may enable 435 behind-the-meter power input system 210 to provide three-phase nominal AC voltage to the power distribution system (215 of FIG. 2) to power the plurality of computing systems (100 of FIG. 2) or a subset thereof. Datacenter control system 220 may optionally direct one or more computing systems (100 of FIG. 2) to perform predetermined computational operations (e.g., distributed computing processes). For example, if the one or more computing systems (100 of FIG. 2) are configured to perform blockchain hashing operations, datacenter control system 220 may direct them to perform blockchain hashing operations for a specific blockchain application, such as, for example, Bitcoin, Litecoin, or Ethereum. Alternatively, one or more computing systems (100 of FIG. 2) may be configured to independently receive a computational directive from a network connection (not shown) to a peer-to-peer blockchain network (not shown) such as, for example, a network for a specific blockchain application, to perform predetermined computational operations.

Remote master control system 420 may specify to datacenter control system 220 what sufficient behind-the-meter power availability constitutes, or datacenter control system 220 may be programmed with a predetermined preference or criteria on which to make the determination independently. For example, in certain circumstances, sufficient behind-the-meter power availability may be less than that required to fully power the entire flexible datacenter 200. In such circumstances, datacenter control system 220 may provide power to only a subset of computing systems (100 of FIG. 2), or operate the plurality of computing systems (100 of FIG. 2) in a lower power mode, that is within the sufficient, but less than full, range of power that is available.

While flexible datacenter 200 is online and operational, a datacenter ramp-down condition may be met when there is insufficient, or anticipated to be insufficient, behind-the-meter power availability or there is an operational directive from local station control system 410, remote master control system 420, or grid operator 440. Datacenter control system 220 may monitor and determine when there is insufficient, or anticipated to be insufficient, behind-the-meter power availability. As noted above, sufficiency may be specified by remote master control system 420 or datacenter control system 220 may be programmed with a predetermined preference or criteria on which to make the determination independently. An operational directive may be based on current dispatchability, forward looking forecasts for when unutilized behind-the-meter power is, or is expected to be, available, economic considerations, reliability considerations, operational considerations, or the discretion of the local station 410, remote master control 420, or grid operator 440. For example, local station control system 410, remote master control system 420, or grid operator 440 may issue an operational directive to flexible datacenter 200 to go offline and power down. When the datacenter ramp-down condition is met, datacenter control system 220 may disable power delivery to the plurality of computing systems (100 of FIG. 2). Datacenter control system 220 may disable 435 behind-the-meter power input system 210 from providing three-phase nominal AC voltage to the power distribution system (215 of FIG. 2) to power down the plurality of computing systems (100 of FIG. 2), while datacenter control system 220 remains powered and is capable of rebooting flexible datacenter 200 when unutilized behind-the-meter power becomes available again.

While flexible datacenter 200 is online and operational, changed conditions or an operational directive may cause datacenter control system 220 to modulate power consumption by flexible datacenter 200. Datacenter control system 220 may determine, or local station control system 410, remote master control system 420, or grid operator 440 may communicate, that a change in local conditions may result in less power generation, availability, or economic feasibility, than would be necessary to fully power flexible datacenter 200. In such situations, datacenter control system 220 may take steps to reduce or stop power consumption by flexible datacenter 200 (other than that required to maintain operation of datacenter control system 220). Alternatively, local station control system 410, remote master control system 420, or grid operator 440, may issue an operational directive to reduce power consumption for any reason, the cause of which may be unknown. In response, datacenter control system 220 may dynamically reduce or withdraw power delivery to one or more computing systems (100 of FIG. 2) to meet the dictate. Datacenter control system 220 may controllably provide three-phase nominal AC voltage to a smaller subset of computing systems (100 of FIG. 2) to reduce power consumption. Datacenter control system 220 may dynamically reduce the power consumption of one or more computing systems (100 of FIG. 2) by reducing their operating frequency or forcing them into a lower power mode through a network directive.

One of ordinary skill in the art will recognize that datacenter control system 220 may be configured to have a number of different configurations, such as a number or type or kind of computing systems (100 of FIG. 2) that may be powered, and in what operating mode, that correspond to a number of different ranges of sufficient and available unutilized behind-the-meter power availability. As such, datacenter control system 220 may modulate power delivery over a variety of ranges of sufficient and available unutilized behind-the-meter power availability.

Figure 5:
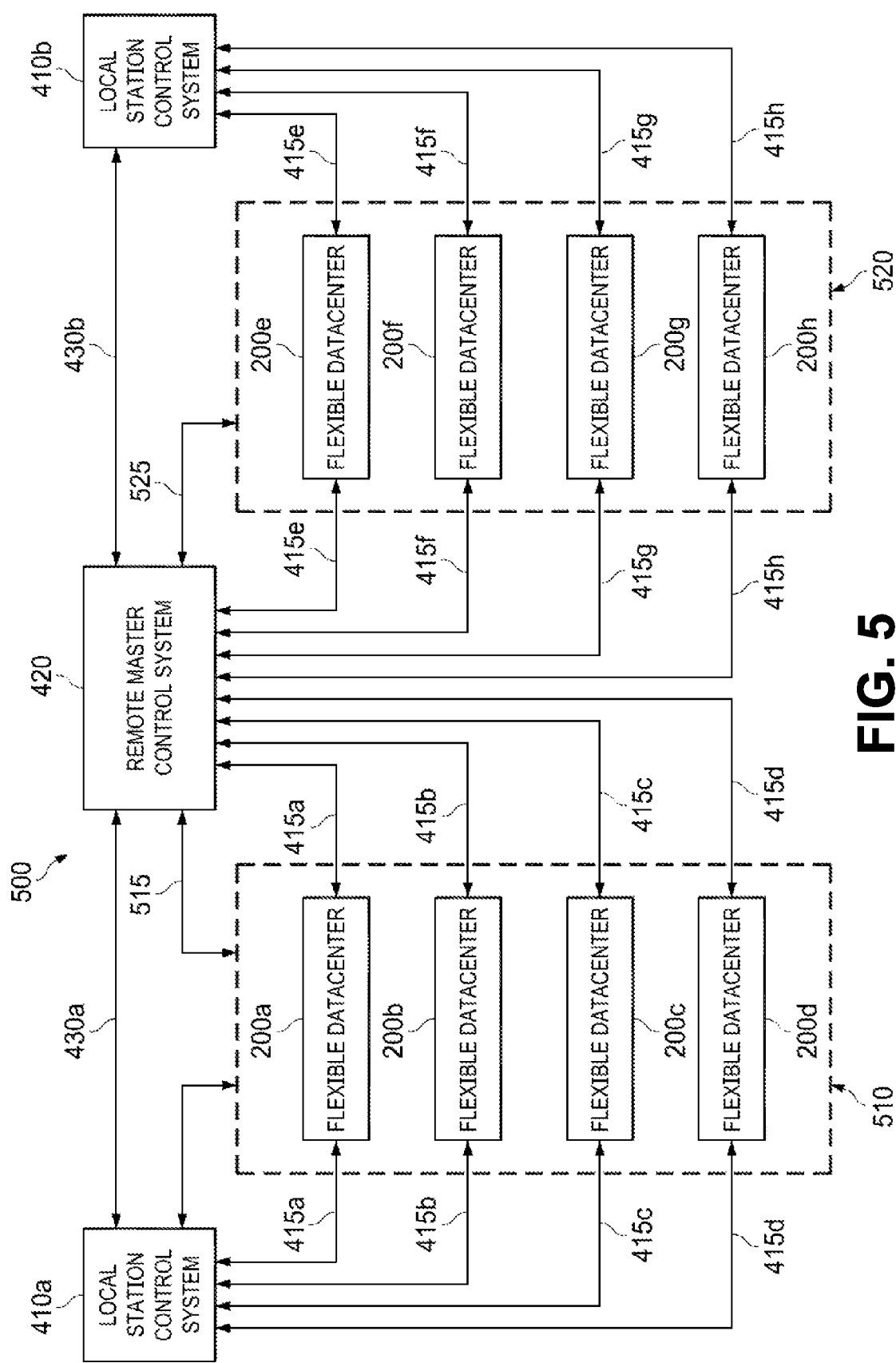
FIG. 5 shows a control distribution scheme of a fleet of flexible datacenters in accordance with one or more embodiments of the present invention.

FIG. 5 shows a control distribution of a fleet 500 of flexible datacenters 200 in accordance with one or more embodiments of the present invention. The control distribution of a flexible datacenter 200 shown and described with respect to FIG. 4 may be extended to a fleet 500 of flexible datacenters 200. For example, a first local station (not independently illustrated), such as, for example, a wind farm (not shown), may include a first plurality 510 of flexible datacenters 200a through 200d, which may be collocated or distributed across the local station (not shown). A second local station (not independently illustrated), such as, for example, another wind farm or a solar farm (not shown), may include a second plurality 520 of flexible datacenters 200e through 200h, which may be collocated or distributed across the local station (not shown). One of ordinary skill in the art will recognize that the number of flexible datacenters 200 deployed at a given station and the number of stations within the fleet may vary based on an application or design in accordance with one or more embodiments of the present invention.

Remote master control system 420 may provide supervisory control over fleet 500 of flexible datacenters 200 in a similar manner to that shown and described with respect to FIG. 4, with the added flexibility to make high level decisions with respect to fleet 500 that may be counterintuitive to a given station. Remote master control system 420 may make decisions regarding the issuance of operational directives to a given local station based on, for example, the status of each local station where flexible datacenters 200 are deployed, the workload distributed across fleet 500, and the expected computational demand required for the expected workload. In addition, remote master control system 420 may shift workloads from a first plurality 510 of flexible datacenters 200 to a second plurality 520 of flexible datacenters 200 for any reason, including, for example, a loss of unutilized behind-the-meter power availability at one local station and the availability of unutilized behind-the-meter power at another local station.

Figure 6:
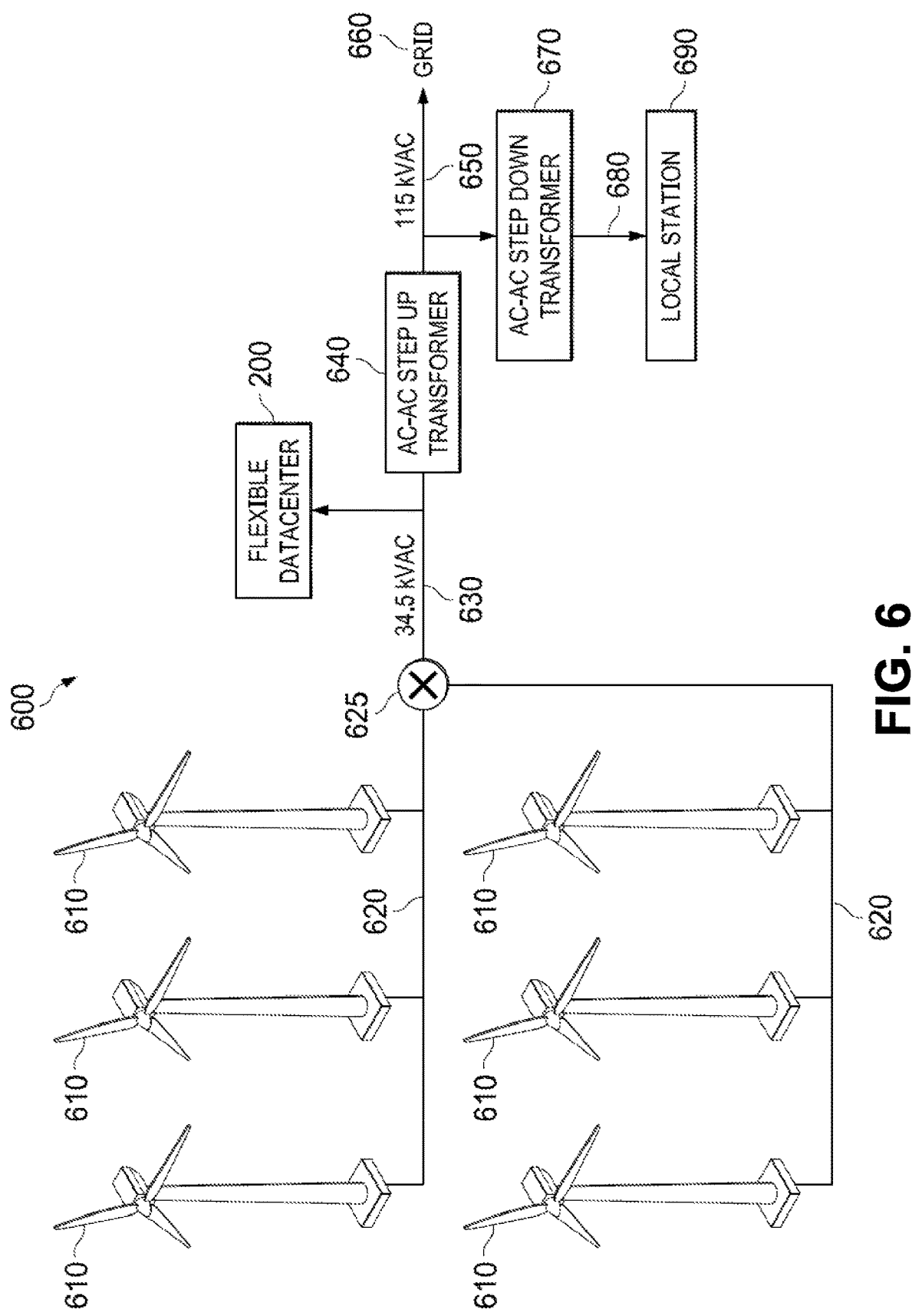
FIG. 6 shows a flexible datacenter powered by one or more wind turbines in accordance with one or more embodiments of the present invention.

FIG. 6 shows a flexible datacenter 200 powered by one or more wind turbines 610 in accordance with one or more embodiments of the present invention. A wind farm 600 typically includes a plurality of wind turbines 610, each of which intermittently generates a wind-generated AC voltage. The wind-generated AC voltage may vary based on a type, kind, or configuration of farm 600, turbine 610, and incident wind speed. The wind-generated AC voltage is typically input into a turbine AC-to-AC step-up transformer (not shown) that is disposed within the nacelle (not independently illustrated) or at the base of the mast (not independently illustrated) of turbine 610. The turbine AC-to-AC step up transformer (not shown) outputs three-phase wind-generated AC voltage 620. Three-phase wind-generated AC voltage 620 produced by the plurality of wind turbines 610 is collected 625 and provided 630 to another AC-to-AC step-up transformer 640 that steps up three-phase wind-generated AC voltage 620 to three-phase grid AC voltage 650 suitable for delivery to grid 660. Three-phase grid AC voltage 650 may be stepped down with an AC-to-AC step-down transformer 670 configured to produce three-phase local station AC voltage 680 provided to local station 690. One of ordinary skill in the art will recognize that the actual voltage levels may vary based on the type, kind, or number of wind turbines 610, the configuration or design of wind farm 600, and grid 660 that it feeds into.

The output side of AC-to-AC step-up transformer 640 that connects to grid 660 may be metered and is typically subject to transmission and distribution costs. In contrast, power consumed on the input side of AC-to-AC step-up transformer 640 may be considered behind-the-meter and is typically not subject to transmission and distribution costs. As such, one or more flexible datacenters 200 may be powered by three-phase wind-generated AC voltage 620. Specifically, in wind farm 600 applications, the three-phase behind-the-meter AC voltage used to power flexible datacenter 200 may be three-phase wind-generated AC voltage 620. As such, flexible datacenter 200 may reside behind-the-meter, avoid transmission and distribution costs, and may be dynamically powered when unutilized behind-the-meter power is available.

Unutilized behind-the-meter power availability may occur when there is excess local power generation. In high wind conditions, wind farm 600 may generate more power than, for example, AC-to-AC step-up transformer 640 is rated for. In such situations, wind farm 600 may have to take steps to protect its equipment from damage, which may include taking one or more turbines 610 offline or shunting their voltage to dummy loads or ground. Advantageously, one or more flexible datacenters 200 may be used to consume power on the input side of AC-to-AC step-up transformer 640, thereby allowing wind farm 600 to operate equipment within operating ranges while flexible datacenter 200 receives behind-the-meter power without transmission or distribution costs. The local station control system (not independently illustrated) of local station 690 may issue an operational directive to the one or more flexible datacenters 200 or to the remote master control system (420 of FIG. 4) to ramp-up to the desired power consumption level. When the operational directive requires the cooperative action of multiple flexible datacenters 200, the remote mater control system (420 of FIG. 4) may determine how to power each individual flexible datacenter 200 in accordance with the operational directive or provide an override to each flexible datacenter 200.

Another example of unutilized behind-the-meter power availability is when grid 660 cannot, for whatever reason, take the power being produced by wind farm 600. In such situations, wind farm 600 may have to take one or more turbines 610 offline or shunt their voltage to dummy loads or ground. Advantageously, one or more flexible datacenters 200 may be used to consume power on the input side of AC-to-AC step-up transformer 640, thereby allowing wind farm 600 to either produce power to grid 660 at a lower level or shut down transformer 640 entirely while flexible datacenter 200 receives behind-the-meter power without transmission or distribution costs. The local station control system (not independently illustrated) of local station 690 or the grid operator (not independently illustrated) of grid 660 may issue an operational directive to the one or more flexible datacenters 200 or to the remote master control system (420 of FIG. 4) to ramp-up to the desired power consumption level. When the operational directive requires the cooperative action of multiple flexible datacenters 200, the remote master control system (420 of FIG. 4) may determine how to power each individual flexible datacenter 200 in accordance with the operational directive or provide an override to each flexible datacenter 200.

Another example of unutilized behind-the-meter power availability is when wind farm 600 is selling power to grid 660 at a negative price that is offset by a production tax credit. In certain circumstances, the value of the production tax credit may exceed the price wind farm 600 would have to pay to grid 660 to offload their generated power. Advantageously, one or more flexible datacenters 200 may be used to consume power behind-the-meter, thereby allowing wind farm 600 to produce and obtain the production tax credit, but sell less power to grid 660 at the negative price. The local station control system (not independently illustrated) of local station 690 may issue an operational directive to the one or more flexible datacenters 200 or to the remote master control system (420 of FIG. 4) to ramp-up to the desired power consumption level. When the operational directive requires the cooperative action of multiple flexible datacenter 200, the remote master control system (420 of FIG. 4) may determine how to power each individual flexible datacenter 200 in accordance with the operational directive or provide an override to each flexible datacenter 200.

Another example of unutilized behind-the-meter power availability is when wind farm 600 is selling power to grid 660 at a negative price because grid 660 is oversupplied or is instructed to stand down and stop producing altogether. The grid operator (not independently illustrated) may select certain power generation stations to go offline and stop producing power to grid 660. Advantageously, one or more flexible datacenters 200 may be used to consume power behind-the-meter, thereby allowing wind farm 600 to stop producing power to grid 660, but making productive use of the power generated behind-the-meter without transmission or distribution costs. The local station control system (not independently illustrated) of the local station 690 or the grid operator (not independently illustrated) of grid 660 may issue an operational directive to the one or more flexible datacenters 200 or to the remote master control system (420 of FIG. 4) to ramp-up to the desired power consumption level. When the operational directive requires the cooperative action of multiple flexible datacenters 200, the remote master control system (420 of FIG. 4) may determine how to power each individual flexible datacenter 200 in accordance with the operational directive or provide an override to each flexible datacenter 200.

Another example of unutilized behind-the-meter power availability is when wind farm 600 is producing power to grid 660 that is unstable, out of phase, or at the wrong frequency, or grid 660 is already unstable, out of phase, or at the wrong frequency for whatever reason. The grid operator (not independently illustrated) may select certain power generation stations to go offline and stop producing power to grid 660. Advantageously, one or more flexible datacenters 200 may be used to consume power behind-the-meter, thereby allowing wind farm 600 to stop producing power to grid 660, but make productive use of the power generated behind-the-meter without transmission or distribution costs. The local station control system (not independently illustrated) of local station 690 may issue an operational directive to the one or more flexible datacenters 200 or to the remote master control system (420 of FIG. 4) to ramp-up to the desired power consumption level. When the operational directive requires the cooperative action of multiple flexible datacenters 200, the remote master control system (420 of FIG. 4) may determine how to power each individual flexible datacenter 200 in accordance with the operational directive or provide an override to each flexible datacenter 200.

Further examples of unutilized behind-the-meter power availability is when wind farm 600 experiences low wind conditions that make it not economically feasible to power up certain components, such as, for example, the local station (not independently illustrated), but there may be sufficient behind-the-meter power availability to power one or more flexible datacenters 200. Similarly, unutilized behind-the-meter power availability may occur when wind farm 600 is starting up, or testing, one or more turbines 610. Turbines 610 are frequently offline for installation, maintenance, and service and must be tested prior to coming online as part of the array. One or more flexible datacenters 200 may be powered by one or more turbines 610 that are offline from farm 600. The above-noted examples of when unutilized behind-the-meter power is available are merely exemplary and are not intended to limit the scope of what one of ordinary skill in the art would recognize as unutilized behind-the-meter power availability. Unutilized behind-the-meter power availability may occur anytime there is power available and accessible behind-the-meter that is not subject to transmission and distribution costs and there is an economic advantage to using it.

One of ordinary skill in the art will recognize that wind farm 600 and wind turbine 610 may vary based on an application or design in accordance with one or more embodiments of the present invention.

Figure 7:
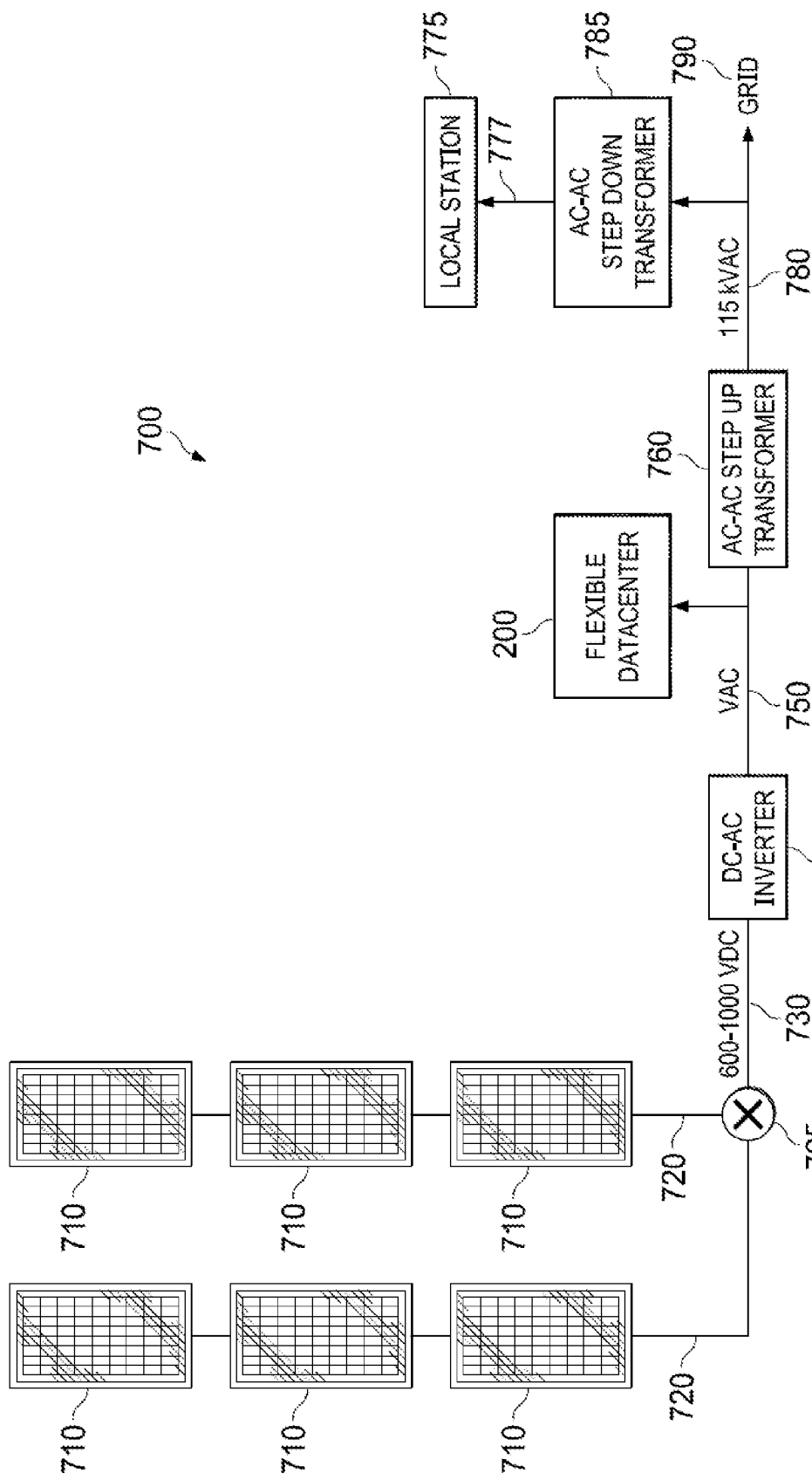
FIG. 7 shows a flexible datacenter powered by one or more solar panels in accordance with one or more embodiments of the present invention.

FIG. 7 shows a flexible datacenter 200 powered by one or more solar panels 710 in accordance with one or more embodiments of the present invention. A solar farm 700 typically includes a plurality of solar panels 710, each of which intermittently generates a solar-generated DC voltage 720. Solar-generated DC voltage 720 may vary based on a type, kind, or configuration of farm 700, panel 710, and incident sunlight. Solar-generated DC voltage 720 produced by the plurality of solar panels 710 is collected 725 and provided 730 to a DC-to-AC inverter that converts solar-generated DC voltage into three-phase solar-generated AC voltage 750. Three-phase solar-generated AC voltage 750 is provided to an AC-to-AC step-up transformer 760 that steps up three-phase solar-generated AC voltage to three-phase grid AC voltage 790. Three-phase grid AC voltage 790 may be stepped down with an AC-to-AC step-down transformer 785 configured to produce three-phase local station AC voltage 777 provided to local station 775. One of ordinary skill in the art will recognize that the actual voltage levels may vary based on the type, kind, or number of solar panels 710, the configuration or design of solar farm 700, and grid 790 that it feeds into. In some embodiments, the solar farm 700 may provide DC power directly to flexible datacenter 200 without a conversion to AC via the DC-to-AC inverter 740.

The output side of AC-to-AC step-up transformer 760 that connects to grid 790 may be metered and is typically subject to transmission and distribution costs. In contrast, power consumed on the input side of AC-to-AC step-up transformer 760 may be considered behind-the-meter and is typically not subject to transmission and distribution costs. As such, one or more flexible datacenters 200 may be powered by three-phase solar-generated AC voltage 750. Specifically, in solar farm 700 applications, the three-phase behind-the-meter AC voltage used to power flexible datacenter 200 may be three-phase solar-generated AC voltage 750. As such, flexible datacenter 200 may reside behind-the-meter, avoid transmission and distribution costs, and may be dynamically powered when unutilized behind-the-meter power is available.

Unutilized behind-the-meter power availability may occur when there is excess local power generation. In high incident sunlight situations, solar farm 700 may generate more power than, for example, AC-to-AC step-up transformer 760 is rated for. In such situations, solar farm 700 may have to take steps to protect its equipment from damage, which may include taking one or more panels 710 offline or shunting their voltage to dummy loads or ground. Advantageously, one or more flexible datacenters 200 may be used to consume power on the input side of AC-to-AC step-up transformer 760, thereby allowing solar farm 700 to operate equipment within operating ranges while flexible datacenter 200 receives behind-the-meter power without transmission or distribution costs. The local station control system (not independently illustrated) of local station 775 may issue an operational directive to the one or more flexible datacenters 200 or to the remote master control system (420 of FIG. 4) to ramp-up to the desired power consumption level. When the operational directive requires the cooperative action of multiple flexible datacenters 200, the remote mater control system (420 of FIG. 4) may determine how to power each individual flexible datacenter 200 in accordance with the operational directive or provide an override to each flexible datacenter 200.

Another example of unutilized behind-the-meter power availability is when grid 790 cannot, for whatever reason, take the power being produced by solar farm 700. In such situations, solar farm 700 may have to take one or more panels 710 offline or shunt their voltage to dummy loads or ground. Advantageously, one or more flexible datacenters 200 may be used to consume power on the input side of AC-to-AC step-up transformer 760, thereby allowing solar farm 700 to either produce power to grid 790 at a lower level or shut down transformer 760 entirely while flexible datacenter 200 receives behind-the-meter power without transmission or distribution costs. The local station control system (not independently illustrated) of local station 775 or the grid operator (not independently illustrated) of grid 790 may issue an operational directive to the one or more flexible datacenters 200 or to the remote master control system (420 of FIG. 4) to ramp-up to the desired power consumption level. When the operational directive requires the cooperative action of multiple flexible datacenters 200, the remote master control system (420 of FIG. 4) may determine how to power each individual flexible datacenter 200 in accordance with the operational directive or provide an override to each flexible datacenter 200.

Another example of unutilized behind-the-meter power availability is when solar farm 700 is selling power to grid 790 at a negative price that is offset by a production tax credit. In certain circumstances, the value of the production tax credit may exceed the price solar farm 700 would have to pay to grid 790 to offload their generated power. Advantageously, one or more flexible datacenters 200 may be used to consume power behind-the-meter, thereby allowing solar farm 700 to produce and obtain the production tax credit, but sell less power to grid 790 at the negative price. The local station control system (not independently illustrated) of local station 775 may issue an operational directive to the one or more flexible datacenters 200 or to the remote master control system (420 of FIG. 4) to ramp-up to the desired power consumption level. When the operational directive requires the cooperative action of multiple flexible datacenters 200, the remote master control system (420 of FIG. 4) may determine how to power each individual flexible datacenter 200 in accordance with the operational directive or provide an override to each flexible datacenter 200.

Another example of unutilized behind-the-meter power availability is when solar farm 700 is selling power to grid 790 at a negative price because grid 790 is oversupplied or is instructed to stand down and stop producing altogether. The grid operator (not independently illustrated) may select certain power generation stations to go offline and stop producing power to grid 790. Advantageously, one or more flexible datacenters 200 may be used to consume power behind-the-meter, thereby allowing solar farm 700 to stop producing power to grid 790, but making productive use of the power generated behind-the-meter without transmission or distribution costs. The local station control system (not independently illustrated) of the local station 775 or the grid operator (not independently illustrated) of grid 790 may issue an operational directive to the one or more flexible datacenters 200 or to the remote master control system (420 of FIG. 4) to ramp-up to the desired power consumption level. When the operational directive requires the cooperative action of multiple flexible datacenters 200, the remote master control system (420 of FIG. 4) may determine how to power each individual flexible datacenter 200 in accordance with the operational directive or provide an override to each flexible datacenter 200.

Another example of unutilized behind-the-meter power availability is when solar farm 700 is producing power to grid 790 that is unstable, out of phase, or at the wrong frequency, or grid 790 is already unstable, out of phase, or at the wrong frequency for whatever reason. The grid operator (not independently illustrated) may select certain power generation stations to go offline and stop producing power to grid 790. Advantageously, one or more flexible datacenters 200 may be used to consume power behind-the-meter, thereby allowing solar farm 700 to stop producing power to grid 790, but make productive use of the power generated behind-the-meter without transmission or distribution costs. The local station control system (not independently illustrated) of local station 775 may issue an operational directive to the one or more flexible datacenters 200 or to the remote master control system (420 of FIG. 4) to ramp-up to the desired power consumption level. When the operational directive requires the cooperative action of multiple flexible datacenters 200, the remote master control system (420 of FIG. 4) may determine how to power each individual flexible datacenter 200 in accordance with the operational directive or provide an override to each flexible datacenter 200.

Further examples of unutilized behind-the-meter power availability is when solar farm 700 experiences intermittent cloud cover such that it is not economically feasible to power up certain components, such as, for example local station 775, but there may be sufficient behind-the-meter power availability to power one or more flexible datacenters 200. Similarly, unutilized behind-the-meter power availability may occur when solar farm 700 is starting up, or testing, one or more panels 710. Panels 710 are frequently offline for installation, maintenance, and service and must be tested prior to coming online as part of the array. One or more flexible datacenters 200 may be powered by one or more panels 710 that are offline from farm 700. The above-noted examples of when unutilized behind-the-meter power is available are merely exemplary and are not intended to limit the scope of what one of ordinary skill in the art would recognize as unutilized behind-the-meter power availability. Behind-the-meter power availability may occur anytime there is power available and accessible behind-the-meter that is not subject to transmission and distribution costs and there is an economic advantage to using it.

One of ordinary skill in the art will recognize that solar farm 700 and solar panel 710 may vary based on an application or design in accordance with one or more embodiments of the present invention.

Figure 8:
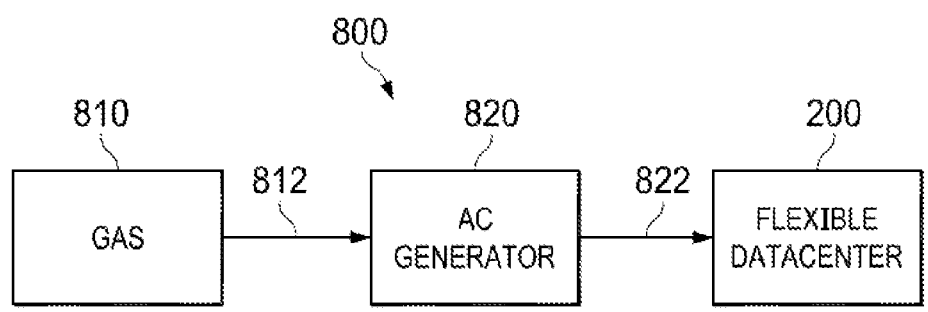
FIG. 8 shows a flexible datacenter powered by flare gas in accordance with one or more embodiments of the present invention.

FIG. 8 shows a flexible datacenter 200 powered by flare gas 800 in accordance with one or more embodiments of the present invention. Flare gas 800 is combustible gas produced as a product or by-product of petroleum refineries, chemical plants, natural gas processing plants, oil and gas drilling rigs, and oil and gas production facilities. Flare gas 800 is typically burned off through a flare stack (not shown) or vented into the air. In one or more embodiments of the present invention, flare gas 800 may be diverted 812 to a gas-powered generator that produces three-phase gas-generated AC voltage 822. This power may be considered behind-the-meter and is not subject to transmission and distribution costs. As such, one or more flexible datacenters 200 may be powered by three-phase gas-generated AC voltage. Specifically, the three-phase behind-the-meter AC voltage used to power flexible datacenter 200 may be three-phase gas-generated AC voltage 822. Accordingly, flexible datacenter 200 may reside behind-the-meter, avoid transmission and distribution costs, and may be dynamically powered when unutilized behind-the-meter power is available.

Figure 9A:
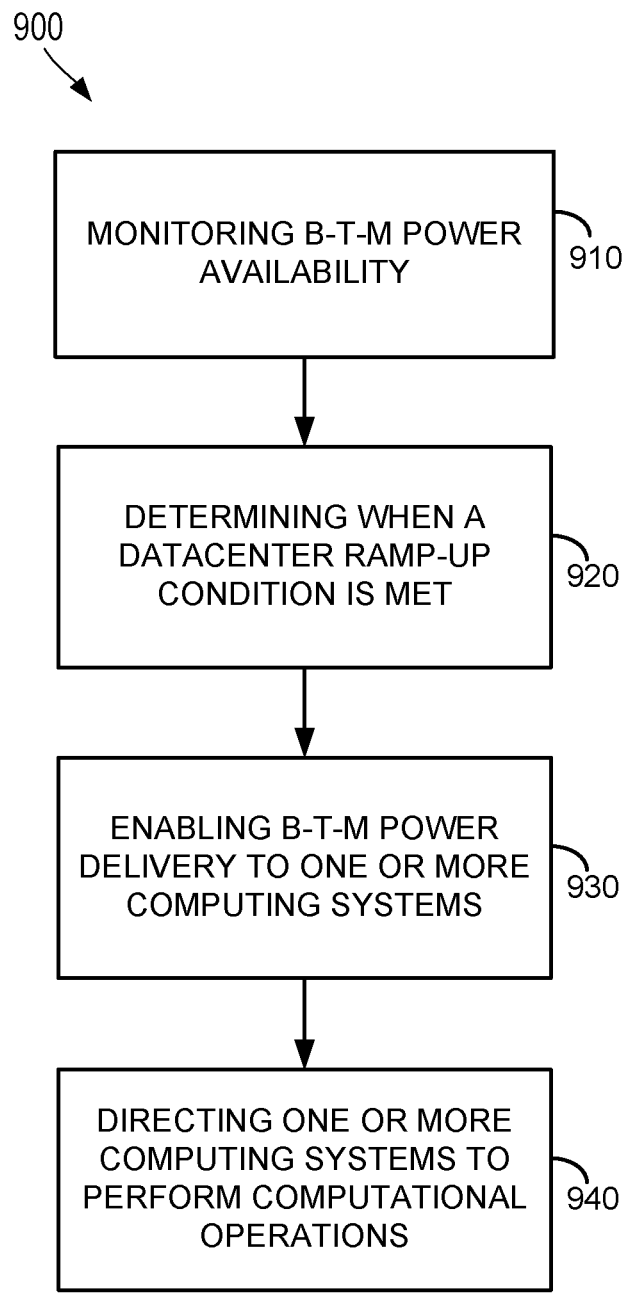
FIG. 9A shows a method of dynamic power delivery to a flexible datacenter using available behind-the-meter power in accordance with one or more embodiments of the present invention.

FIG. 9A shows a method of dynamic power delivery to a flexible datacenter (200 of FIG. 2) using behind-the-meter power 900 in accordance with one or more embodiments of the present invention. In step 910, the datacenter control system (220 of FIG. 4), or the remote master control system (420 of FIG. 4), may monitor behind-the-meter power availability. In certain embodiments, monitoring may include receiving information or an operational directive from the local station control system (410 of FIG. 4) or the grid operator (440 of FIG. 4) corresponding to behind-the-meter power availability.

In step 920, the datacenter control system (220 of FIG. 4), or the remote master control system (420 of FIG. 4), may determine when a datacenter ramp-up condition is met. In certain embodiments, the datacenter ramp-up condition may be met when there is sufficient behind-the-meter power availability and there is no operational directive from the local station to go offline or reduce power. In step 930, the datacenter control system (220 of FIG. 4) may enable behind-the-meter power delivery to one or more computing systems (100 of FIG. 2). In step 940, once ramped-up, the datacenter control system (220 of FIG. 4) or the remote master control system (420 of FIG. 4) may direct one or more computing systems (100 of FIG. 2) to perform predetermined computational operations. In certain embodiments, the predetermined computational operations may include the execution of one or more distributed computing processes, parallel processes, and/or hashing functions, among other processes.

While operational, the datacenter control system (220 of FIG. 4), or the remote master control system (420 of FIG. 4), may receive an operational directive to modulate power consumption. In certain embodiments, the operational directive may be a directive to reduce power consumption. In such embodiments, the datacenter control system (220 of FIG. 4) or the remote master control system (420 of FIG. 4) may dynamically reduce power delivery to one or more computing systems (100 of FIG. 2) or dynamically reduce power consumption of one or more computing systems. In other embodiments, the operational directive may be a directive to provide a power factor correction factor. In such embodiments, the datacenter control system (220 of FIG. 4) or the remote master control system (420 of FIG. 4) may dynamically adjust power delivery to one or more computing systems (100 of FIG. 2) to achieve a desired power factor correction factor. In still other embodiments, the operational directive may be a directive to go offline or power down. In such embodiments, the datacenter control system (220 of FIG. 4) may disable power delivery to one or more computing systems (100 of FIG. 2).

Figure 9B:
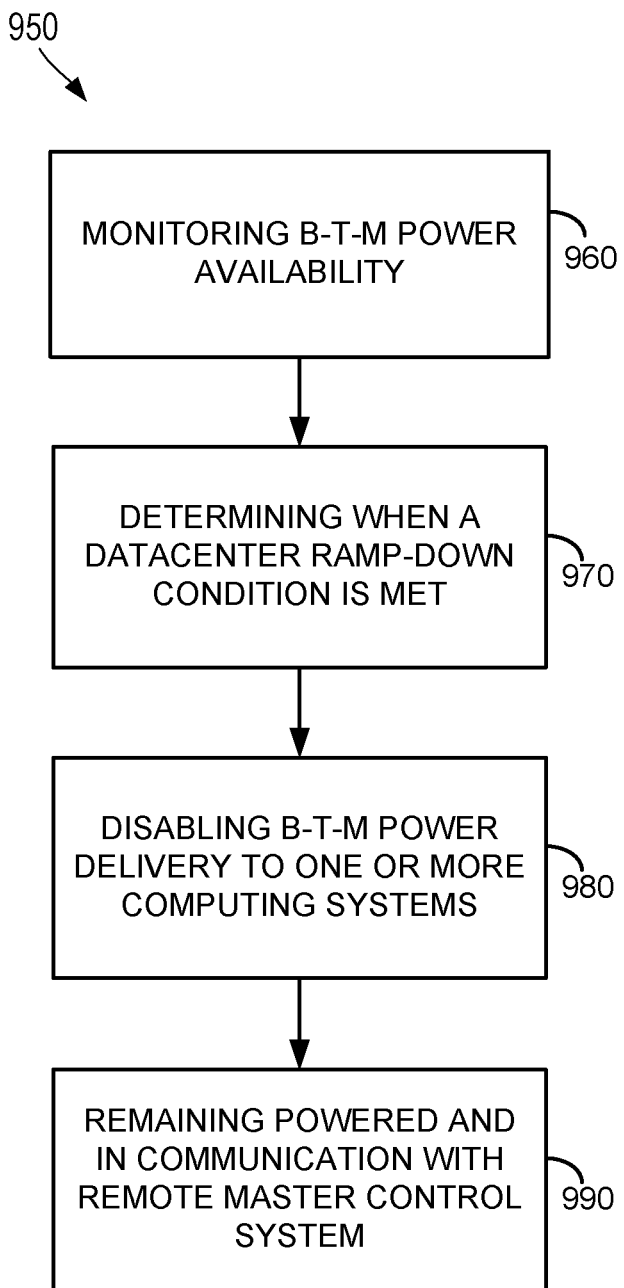
FIG. 9B shows another method of dynamic power delivery to a flexible datacenter using behind-the-meter power in accordance with one or more embodiments of the present invention.

As such, FIG. 9B shows a method of dynamic power delivery to a flexible datacenter (200 of FIG. 2) using behind-the-meter power 950 in accordance with one or more embodiments of the present invention. In step 960, a control system, such as the datacenter control system (220 of FIG. 4) or the remote master control system (420 of FIG. 4), monitors behind-the-meter power availability. In certain embodiments, monitoring may include receiving information or an operational directive from the local station control system (410 of FIG. 4) or the grid operator (440 of FIG. 4) corresponding to behind-the-meter power availability.

In step 970, the control system determines when a datacenter ramp-down condition is met. In certain embodiments, the datacenter ramp-down condition may be met when there is insufficient behind-the-meter power availability or anticipated to be insufficient behind-the-meter power availability or there is an operational directive from the local station to go offline or reduce power. In step 980, the control system disables behind-the-meter power delivery to one or more computing systems (100 of FIG. 2). In step 990, once ramped-down, the datacenter control system (220 of FIG. 4) remains powered and in communication with the remote master control system (420 of FIG. 4) so that it may control the flexible datacenter (200 of FIG. 2) when conditions change.

The datacenter control system (220 of FIG. 4) may dynamically modulate internal power delivery to one or more systems (e.g., computing systems (100 of FIG. 2) of a flexible datacenter (200 of FIG. 2)) based on behind-the-meter power availability or an operational directive. The flexible datacenter (200 of FIG. 2) may transition between a fully powered down state (while the datacenter control system remains powered), a fully powered up state, and various intermediate states in between. In addition, flexible datacenter (200 of FIG. 2) may have a blackout state, where all power consumption, including that of the datacenter control system (220 of FIG. 4) is halted. However, once the flexible datacenter (200 of FIG. 2) enters the blackout state, it will have to be manually rebooted to restore power to datacenter control system (220 of FIG. 4). Local station conditions or operational directives may cause flexible datacenter (200 of FIG. 2) to ramp-up, reduce power consumption, change power factor, or ramp-down.

Figure 10:
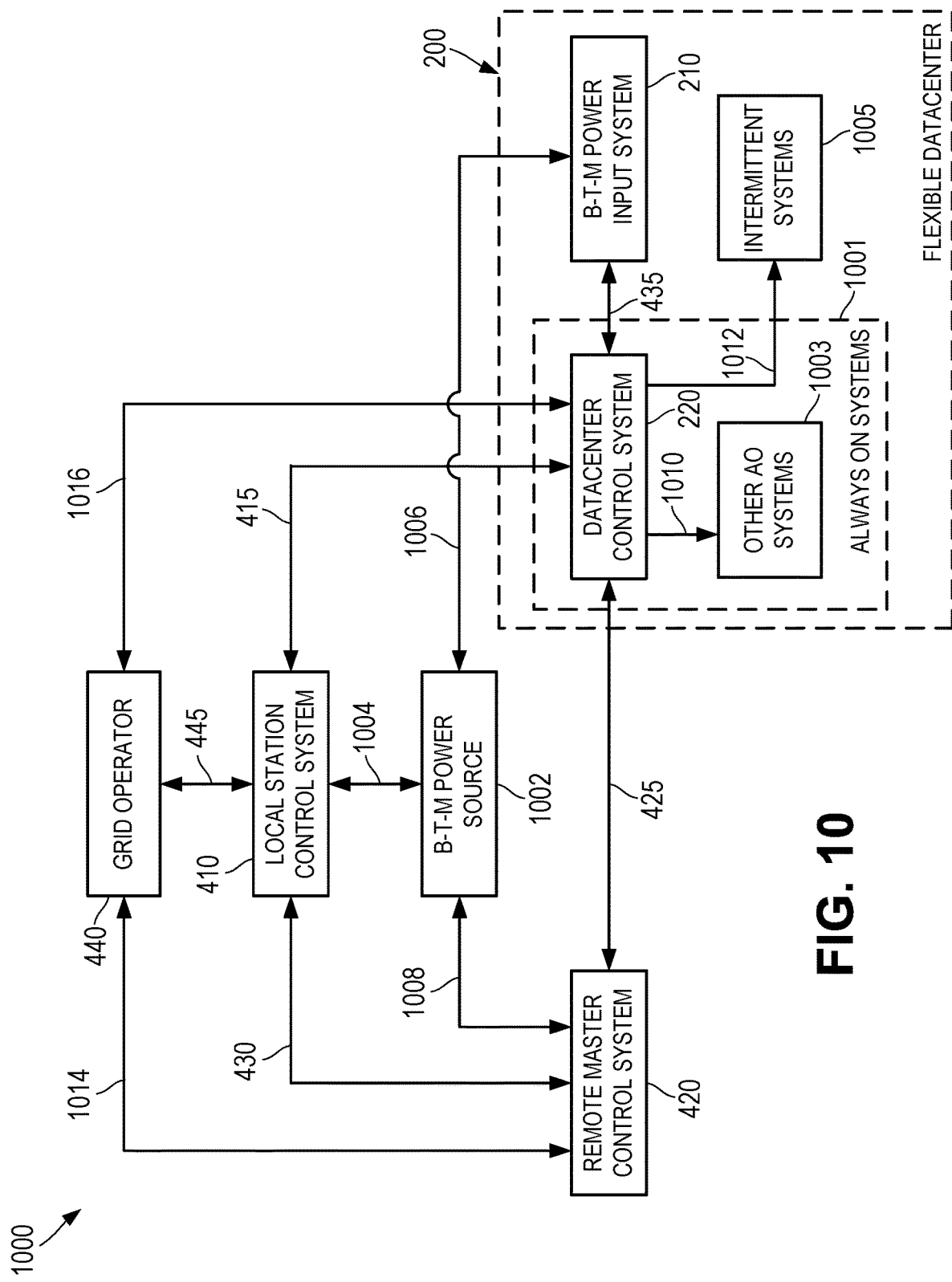
FIG. 10 shows a control distribution scheme in accordance with one or more embodiments of the present invention.

Systems and methods related to auxiliary power management of behind-the-meter power loads, which enables switching between a behind-the-meter power source and alternative power sources will now be described in greater detail. In particular, a control distribution scheme for an embodiment of an auxiliary power management system is described with respect to FIG. 10, which shows control distribution system 1000 in accordance with one or more embodiments of the present invention. The system 1000 is similar to the control distribution scheme 400 illustrated in FIG. 4, with the addition of an intermittent behind-the-meter power source 1002, and always-on systems 1001 and intermittent systems 1005 included within the flexible datacenter 200 described above. Components and aspects illustrated and/or described in FIG. 10 that are similar or the same as components or aspects illustrated and/or described in FIG. 4 (or any other Figure in which a component shown in FIG. 10 is also illustrated) can have the same characteristics as previously illustrated and/or described, or, in some embodiments, could have different characteristics.

The intermittent behind-the-meter power source 1002 may be a power generation unit or system, or part of a larger intermittent power generation system. For example, the intermittent behind-the-meter power source 1002 may be part of one or more power sources described herein.

Within the flexible datacenter 200, the composition of the always-on systems 1001 and intermittent systems 1005 may be dynamically designated during operation of the flexible datacenter 200 or pre-designated in the design of the flexible datacenter 200. In one embodiment, the always-on systems 1001 may include, but are not limited to, a datacenter control system 220 and other always-on systems 1003 such as some or all of a climate control system (e.g., 250, 260, 270, 280, 290) and some or all of the computing systems 100. Flexible datacenter systems designated as always-on systems 1001 may change over time as operational conditions change. Changes may be based on instructions from an outside system (e.g., the remote master control system 420), instructions from an internal system (e.g., the datacenter control system 220), or another source (e.g., during initial set up or subsequent modification of the flexible datacenter 200). The flexible datacenter systems designated as always-on systems 1001 may also change based on the computational operations being performed at the flexible datacenter 200. In some embodiments, the always-on systems 1001 may include one or more servers configured to receive some form of continuous power. In further embodiments, the always-on systems 1001 may include one or more newly installed systems designated to at least initially receive continuous power.

The intermittent systems 1005 are flexible datacenter systems that are not designated as always on and may include, but are not limited to some or all of the climate control system (e.g., 250, 260, 270, 280, 290) not designated as always-on systems 1001 and some or all of the computing systems 100 not designated as always-on systems 1001. In another embodiment, some or all of the datacenter control system 220 may be designated as intermittent systems 1005. In some examples, the systems designated as intermittent systems 1005 may change based on changes to always-on system 1001 designations.

The behind-the-meter power source 1002 can take the form of any one or more components related to behind-the-meter power generation discussed herein. For example, the behind-the-meter power source 1002 can include one or more wind turbines (e.g., wind turbines 610) of a wind farm (e.g., wind farm 600) and associated collectors or transformers. Other sources of behind-the-meter power are possible as well, such as one or more solar panels 710. As shown, the behind-the-meter power source 1002 can have a connection 1004 with the local station control system 410, a connection 1006 with the behind-the-meter power input system 210 of the flexible datacenter 200, and a connection 1008 with the remote master control system 420. Any one or more of these connections can be networked connections and/or hardwired connections and can include communication and/or control capabilities. In alternative embodiments, the behind-the-meter power source 1002 can have more or less connections than those shown in FIG. 10. (For example, the behind-the-meter power source 1002 could have a direct connection (not shown) with the grid operator 440.

Also shown in FIG. 10 is a connection 1010 between the datacenter control system 220 and other always-on systems 1003, as well as a connection 1012 between the datacenter control system 220 and the intermittent systems 1005 (i.e., flexible datacenter systems not designated as always on).

Further, FIG. 10 shows a connection 1014 between the grid operator 440 and the remote master control system 420, as well as a connection 1016 between the grid operator 440 and the datacenter control system 220. More or less connections between any two or more components shown in FIG. 10 are possible.

Any communication described below as being between two or more components of the auxiliary power management system 1000 can occur over one or more of the connections shown in FIG. 10. For example, a signal transmitted from the local station control system 410 to the datacenter control system 220 could be transmitted directly over connection 415. Additionally or alternatively, the same signal could be transmitted via the remote master control system 420 over connection 430 and connection 425. Other examples are possible as well.

Computing systems 100 can receive instructions, such as those for performing computational operations, from the datacenter control system 220. Some or all of computing systems 100 within the flexible datacenter 200 may be designated as always-on systems 1001. The datacenter control system 220 can be configured to control the computing systems 100, the behind-the-meter power input system 210, and to manage resources such as power and data at the flexible datacenter 200. In an embodiment, the datacenter control system 220 can be configured to control an amount of behind-the-meter power and/or grid or other alternative power consumed by the flexible datacenter 200.

In an embodiment, the remote master control system 420 can manage resources, such as power and data, and can manage operations or data associated with any one or more of the components shown in FIG. 10, such as the datacenter control system 220 and/or the behind-the-meter power source 1002. The remote master control system 420 can be located at the site of the flexible datacenter 200 or at a site associated with an enterprise that controls the remote master control system 420. Additionally or alternatively, the remote master control system 420 can be a cloud-based computing system. Further, the remote master control system 420 can be configured to issue instructions (e.g., directives) to the flexible datacenter 200 (e.g., to the datacenter control system 220) that affect an amount of behind-the-meter power and/or grid or other alternative power consumed by the flexible datacenter 200. The remote master control system 420 may provide instructions directly or indirectly (e.g., through the data center control system 220) to the always-on systems 1001.

In an embodiment, the local station control system 410 can be configured to at least partially control the behind-the-meter power source 1002. Additionally or alternatively, the behind-the-meter power source 1002 may be controlled at least in part by the remote master control system 420. The local station control system 410 can be located at the site of the behind-the-meter power source 1002 or elsewhere. The local station control system 410 can be operated independently from the remote master control system 420. That is, the two control systems can be operated by different entities (e.g., enterprises or individuals). In some embodiments, little or no communication can occur between the local station control system 410 and the remote master control system 420.

Figure 11:
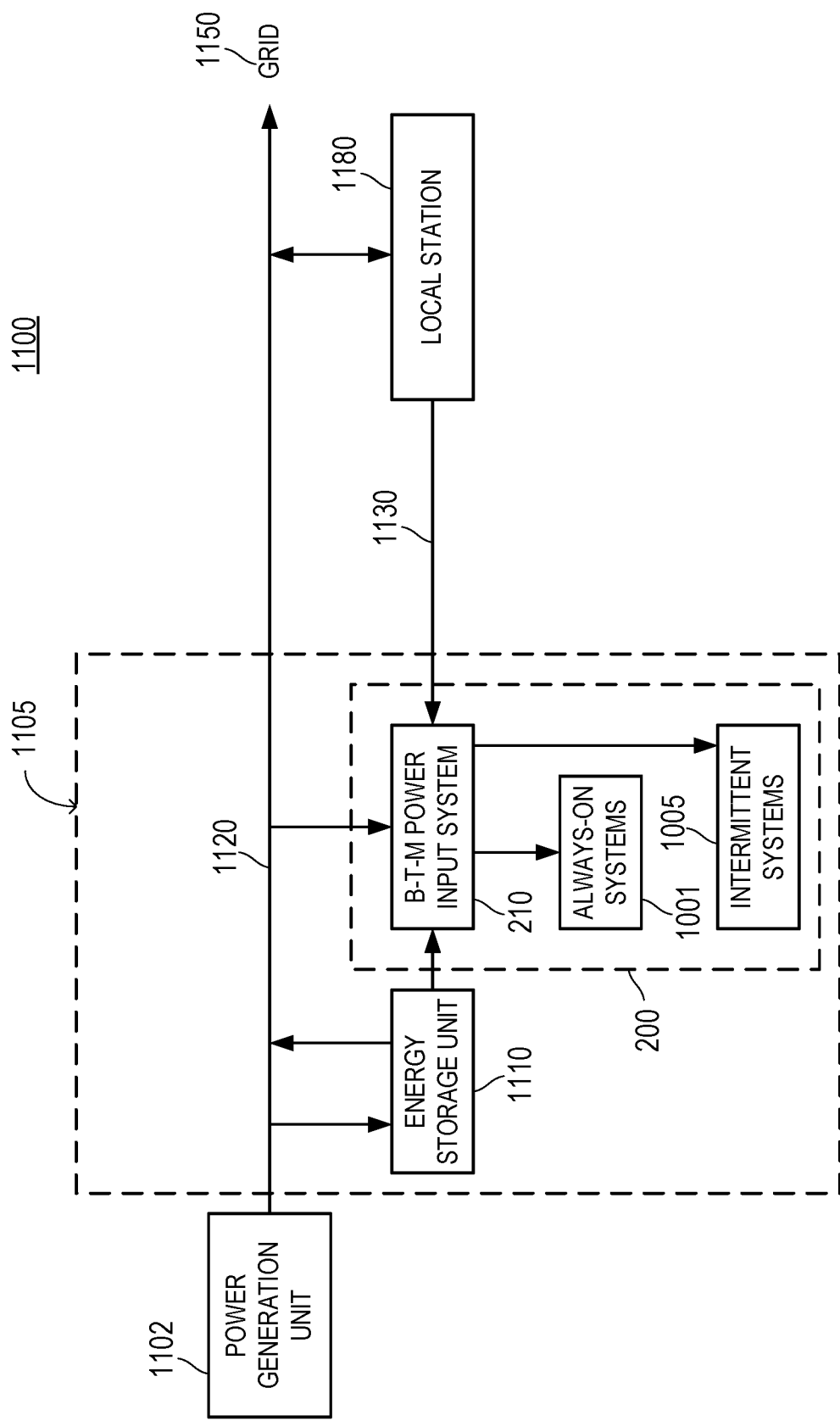
FIG. 11 shows a power distribution scheme with a flexible datacenter that includes always-on and intermittent systems in accordance with one or more embodiments of the present invention.

FIG. 11 shows a power distribution scheme 1100 with a flexible datacenter (200 of FIG. 2 and FIG. 10) and a behind-the-meter energy storage unit 1110 in accordance with one or more embodiments of the present invention. The power distribution scheme 1100 is similar to the schemes illustrated in FIG. 6 and FIG. 7, with the addition of energy storage unit 1110, power 1160 supplied from the grid to the behind-the-meter power input system 210, and the always-on systems 1001 and intermittent systems 1005 of flexible datacenter 200. Components and aspects illustrated and/or described in FIG. 10 that are similar or the same as components or aspects illustrated and/or described in FIG. 6, FIG. 7, and FIG. 10 should be considered to have the same characteristics as previously illustrated and/or described.

Power generation unit 1102 functions as an intermittent behind-the-meter power source (e.g., intermittent behind-the-meter power source 1002) that intermittently generates behind-the-meter power and may include, for example, one or more wind turbines (610 of FIG. 6) with three-phase wind-generated AC voltage (620 of FIG. 6) collected at (625 of FIG. 6). As another example, power generation unit 1002 may include some or all of the following: one or more solar panels (710 of FIG. 7) with DC voltage (720 of FIG. 7) collected at 725 (of FIG. 6) and provided (730 of FIG. 7) to a DC-AC inverter (740 of FIG. 7). The power generation unit 1102 supplies behind-the-meter power 1120 (e.g., AC voltage), such as three-phase AC (630 of FIG. 6 or 750 of FIG. 7), to flexible datacenter 200, as described with respect to FIG. 6 and FIG. 7.

In some embodiments, the power generation unit 1102 may alternatively supply DC power to the flexible datacenter 200. The power generation unit 1102 also supplies behind-the-meter power out to the grid 1150 and power derived from this source may be considered grid- or metered-power. In cases of renewable power generation, power generation unit 1102 will typically generate power on an intermittent basis.

Within the behind-the-meter envelope 1105 is energy storage unit 1110. Energy storage unit 1110 may take numerous forms. For example, energy storage unit 1110 may be a grid-scale power storage system or a local power backup system and may take the form of, for example, a battery backup system, a kinetic storage system (e.g., flywheels), a compressed gas storage system, a thermodynamic storage system, or any other system that can accept and return behind-the-meter power and can supply power to flexible datacenter 200. Energy storage unit 1110 may include one or more individual storage systems, which together form energy storage unit 1110. In the illustrated embodiment, energy storage unit 1110 is connected to behind-the-meter AC voltage 1120 such that it can store power from the power generation unit 1102 and/or dispense stored power to the grid 1150 and/or the flexible datacenter 200. Power derived from the energy storage unit 1110 may be considered behind-the-meter power.

In one embodiment, a control system may cause grid power to be selectively routed back to the flexible datacenter 200 via the behind-the-meter input system 210 (or, in another embodiment, another power input system not illustrated here) as power 1120, which can be used to power the always-on systems 1001, such the some or all of datacenter control system 220, some or all of the climate control system system(s) (e.g., 250, 260, 270, 280, and/or 290), and/or one or more computing systems 100.

The control system, such as a datacenter control system (220 of FIG. 4 and FIG. 10) of the flexible datacenter 200, a remote master control system (420 of FIGS. 4 and 10), and/or a local station control system (410 of FIG. 4 and FIG. 10) may be configured to selectively deliver power to the behind-the-meter power input system 210 from any of the power generation unit 1102, the energy storage unit 1110, and/or the local station 1180, alone or in some combination simultaneously. Power from the power generation unit 1102 and energy storage unit 1110 may be considered behind-the-meter power and power from local station 1180 may be considered grid power (i.e., metered power).

In some embodiments, such as those described with respect to FIG. 10 and FIG. 11, grid power would be selectively supplied to the always-on systems 1001 but not the intermittent systems 1005. In one example, an intermittent power generation unit 1102 may transition from generating power in a power generation mode to a stand-down mode wherein the intermittent power generation unit 1102 does not produce power or produces a reduced amount of power insufficient to power some or all of the datacenter 200. As a result, it may be desirable to adjust or eliminate the behind-the-meter power consumption of the flexible datacenter 200, while still enabling some, but not all, operations of the flexible datacenter 200 (e.g., the always-on systems 1001) via alternative power sources such as grid power.

In one embodiment, it may be desirable to ensure a continuous supply of power to one or more computing systems 100, and/or the datacenter control system 220 and/or the climate control system (e.g., 250, 260, 270, 280, and/or 290) in the flexible datacenter 200. For instance, the one or more computing systems 100 may be performing critical operations and may require power to finish and/or continue performing the critical operations. In other examples, one or more computing systems 100 may require power to maintain a low power state to retain memory or prevent a complete shut down and subsequent restart. In yet other examples, datacenter control system 220 may need to remain powered to conduct communication and supervisory functions while some or all of computing systems 100 are in reduced power or shut down, and/or it may be desirable to keep climate control system (e.g., 250, 260, 270, 280, and/or 290) at least partially active to maintain temperature control within an acceptable range. These systems may therefore be designated as always-on systems 1001. As such, one or more control systems within the control distribution scheme 1000 may cause power to be delivered to systems designated as always-on systems 1001 within the flexible datacenter 200 from one or more alternative power sources when the intermittent behind-the-meter power source 1002 (e.g, intermittent power generation unit 1102) is unable to supply sufficient power to the flexible datacenter 200. The alternative power sources may include the power grid, an energy storage system, or another power source.

Alternatively or additionally, the cost of power from the behind-the-meter power source 1002 may increase, making it desirable to reduce the power consumption of the systems in the flexible datacenter 200. As such, one or more control systems 220, 420, and/or 410 may adjust the power consumption of the computing systems 100 in the flexible datacenter 200 in various ways depending on the circumstances within a given scenario. This may involve supplying power only to a subset of the computing systems 100 (e.g., the always-on systems 1001) or directing power from another source to one or more computing systems 100 (e.g., the always-on systems 1001) in the flexible datacenter 200. The other sources may be able to provide power to one or more computing systems 100 in the flexible datacenter 200, such as the always-on systems 1001 at a lower cost compared to the current cost for power from the behind-the-meter power source 1002.

In some embodiments, one or more control systems 220, 420, and/or 410 may power at least the always-on systems 1001 in the flexible datacenter 200 using power from the energy storage unit 1110. Power from the energy storage unit 1110 may be used to power the always-on systems 1001 thereby increasing the amount of storage space available in the energy storage unit 1110. This way, the energy storage unit 1110 may recharge while the cost of power is low or even negative and subsequently use the recharged power to power the flexible datacenter 200.

Power adjustments for the flexible datacenter 200 can be derived from various sources. For instance, the remote master control system 420 may detect or receive an indication that intermittent behind-the-meter power source 1002 is or will be transitioning into a stand-down mode or producing less power, or the cost of power from the behind-the-meter power source 1002 is increasing or will increase. Based on the indication, the remote master control system 420 may provide a signal (e.g., instructions) to the datacenter control system 220 of the flexible datacenter 200 to adjust power sourcing and/or consumption at the computing systems 100. The adjustments may include maintaining a supply of power to the always-on systems 1001. The signal may trigger operations at the flexible datacenter 200 to change.

In another example, the datacenter control system 220 may detect or receive an indication that the behind-the-meter power source 1002 is or will be transitioning into a stand-down mode or producing less power, or the cost of power from the behind-the-meter power source 1002 is increasing or will increase. Similarly, the local station control system 410 or the behind-the-meter source 1002 may provide an indication to either the remote master control system 420 or the datacenter control system 220 that indicates a change in the power generation or cost of power at the behind-the-meter source 1002. In further embodiments, a control system may alter power consumption and delivery at the flexible datacenter 200 based on changes in power frequency, power use, and/or distribution among a set of power sources.

The types or techniques of power adjustments and extent of the adjustments performed at the flexible datacenter 200 can vary within embodiments. In some embodiments, the control system may alter the amount of total power provided from any power source to the computing systems 100 in the flexible datacenter 200. For instance, the datacenter control system 220 may cause one or more computing systems 100 to switch to a lower power mode of operation. As an example, the datacenter control system 220 may decrease the power supply to one or more computing systems 100 to 75% full power, 50% full power, 25% full power or another quantity.

In other examples, the control system may alter the number of powered computing systems 100 in the flexible datacenter 200. For example, the control system may only supply power to computing systems 100 designated as always on in the flexible datacenter 200. In one embodiment, the datacenter control system 220 may cause the behind-the-meter power input system 210 to adjust power distribution and supply power only to the always-on computing systems of the computing systems 100. In one example, a computing system 100 within the flexible datacenter 200 may be designated as always on based on the operations the computing system 100 is performing or the capabilities of the computing system 100, among other possible reasons.

Power consumption at the flexible datacenter 200 can also be varied in other ways within embodiments. For instance, the remote master control system 420 or the datacenter control system 220 may cycle a limited amount of behind-the-meter power between groups 240 of computing systems 100 within the flexible datacenter 200. An example cycle may include a control system causing the behind-the-meter power input system 210 to selectively supply power to a first group 240 of computing systems 100 for a first period of time (e.g., until completion of a task being performed by the first group 240 of computing systems 100) then selectively supply power to a second group 240 of computing systems 100 for a second period of time. In some examples, a computing system 100 may be within both the first group 240 and the second group 240. For instance, the flexible datacenter 200 may include one or more computing systems 100 that are always designated (e.g., designated by design) as always on and one or more computing systems 100 that are dynamically designated (e.g., designated by need) as always on because they are tasked with performing critical computational operations that must be completed without loss of power. In these example instances, it is desirable or even critical to maintain the supply of power to the always-on systems that are part of groups otherwise designated for loss of behind-the-meter power within a power cycling scheme.

The behind-the-meter power source 1002 may transition into stand-down mode for various reasons. Some of the reasons may depend on the type of the behind-the-meter power source 1002. For example, the wind farm 600 shown in FIG. 6 may temporarily not produce power due to a lack of wind or other conditions that prevent power production (e.g., too high of winds). Similarly, the solar farm 700 shown in FIG. 7 may not produce power in situations where the environment is not adequate for power production (e.g., night time or a cloudy day). Other reasons may cause the behind-the-meter power source 1002 to reduce or stop power production, such as an emergency (e.g., a fire or a bird flying into a wind turbine). As such, when the behind-the-meter power source 1002 is unavailable, the control system(s) may transition the intermittent power source supplying the computing systems 100 in the flexible datacenter 200 to an alternative power source.

In an embodiment, one or more control systems 220, 420, and/or 410 may cause the always-on systems 1001 to switch from the behind-the-meter power source 1002 to a second power source. The second power source may include power from the power grid, another behind-the-meter source (e.g., a different power generation unit) that is not in or entering stand-down mode, or an energy storage device (e.g., a battery system). The flexible datacenter 200 may include hardware as part of the behind-the-meter power input system 210 that is configured to additionally receive power from the power grid and distribute the power among the always-on systems 1001. In some embodiments, the remote master control system 420 or the datacenter control system 220 may selectively direct power to always-on systems 1001 in the flexible datacenter 200 from multiple power sources simultaneously. The multiple power sources may supply power to the same always-on systems 1001 or different sets of always-on systems 1001 within the flexible datacenter 200.

In an embodiment, one or more computing systems 100 designated as always on may be automatically transitioned from using power received from the behind-the-meter power source 1002 to using power received from the power grid when power from the behind-the-meter power source 1002 is insufficiently available or too costly. It may be desirable to ensure that at least some of the computing systems have reliable power from the power gird to prevent stoppage in computational operations. In further examples, when an energy storage unit has available power, one or more computing systems 100 designated as always may be transitioned to receive power from the energy storage unit when power from the behind-the-meter power source 1002 is no longer available.

In an embodiment, one or more control systems 220, 420, and/or 410 may cause a power source transition of always-on systems 1001 because of an increase in the price of power from the behind-the-meter power source 1002. For instance, a set of always-on systems 1001 within the flexible datacenter 200 may require constant power to continue operations or to remain in a lower power mode instead of turning off. As such, the remote master control system 420 or the datacenter control system 220 may switch the set of always-on systems 1001 to grid power or another power source when the price for power from the behind-the-meter power source 1002 increases.

Additionally or alternatively, it may be desirable for the local station control system 410 to direct the flexible datacenter 200 to modulate its power consumption (e.g., by ramping down, ramping up, or otherwise making an adjustment affecting power consumption by the flexible datacenter 200). For example, if there is insufficient available behind-the-meter power, and/or an emergency related to the behind-the-meter power source 1002 (e.g., a fire, or a bird flying into or proximate to a wind turbine), the local station control system 410 can send, to the datacenter control system 220, and thus the datacenter control system 220 can receive—from the local station control system 410 directly and/or via the remote master control system 420—a first operational directive for the flexible datacenter 200 to ramp-down power consumption. In response to receiving the first operational directive, the datacenter control system 220 can cause its power supply to be switched from the behind-the-meter power source 1002 to grid power.

Additionally or alternatively, in response to receiving the first operational directive, the datacenter control system 220 can determine which computing systems 100 are designated always on and then cause the power supply to be switched for those always-on computing systems 100 from the behind-the-meter power source 1002 to grid power.

Additionally or alternatively, in response to receiving the first operational directive, the datacenter control system 220 can cause (e.g., issue instructions to) the computing systems 100 of the flexible datacenter 200 to perform a first set of predetermined operations correlated with the first operational directive. For example, the first set of predetermined operations can include any one or more predetermined operations that result in reduced consumption of the behind-the-meter power by one or more of the computing systems 100. Examples of such predetermined operations will be described in more detail below.

Hereinafter, for brevity's sake, reference to actions performed with respect to "the computing systems 100," such as causing the computing systems 100 to perform operations, reducing behind-the-meter power consumption, etc., means that such actions can be performed with respect to any one or more of the computing systems 100. For example, the flexible datacenter 200 can cause one computing system, all of the computing systems 100, or any number in between, to perform the first set of predetermined operations, such as reducing power consumption and/or turning off.

Figure 12:
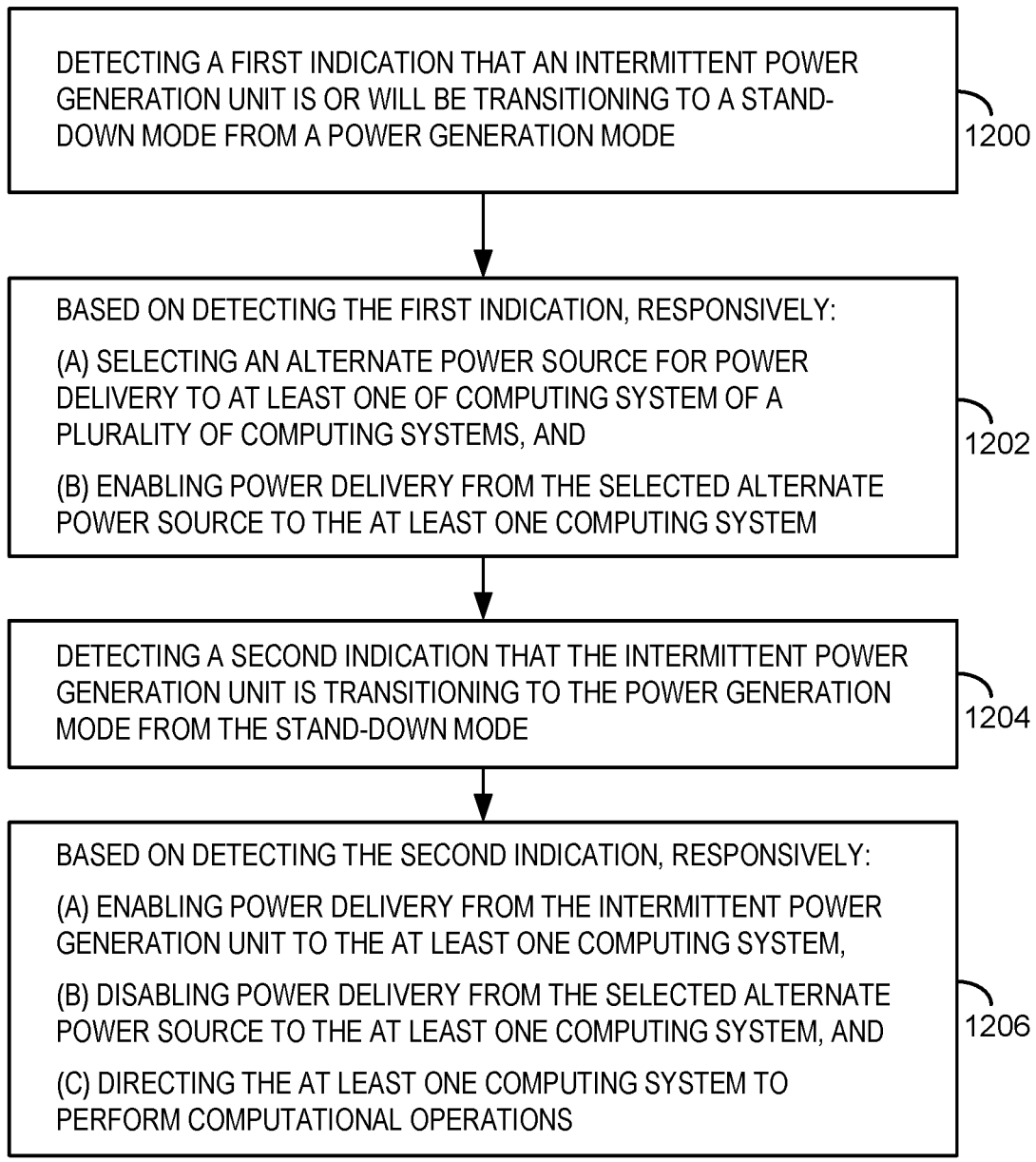
FIG. 12 shows a method of auxiliary power management of behind-the-meter power loads in accordance with one or more embodiments of the present invention.

FIG. 12 shows a method of auxiliary power management of behind-the-meter power loads in accordance with one or more embodiments of the present invention. The method of FIG. 12 may be implemented in the systems and schemes disclosed herein. At step 1200, one or more control systems, such as local station control system 410, datacenter control system 220, and/or remote master control system 420 may detect an indication that an intermittent power generation unit is or will be transitioning to a stand-down mode from a power generation mode. As an example, the power generation unit may be the behind-the-meter power source 1002 in FIG. 10 and/or the power generation unit 1102 in FIG. 11. As previously disclosed, the intermittent power generation unit may generate power during a power generation mode and stop generating power during a stand-down mode. The power generation unit may supply its generated power as behind-the-meter power to a flexible datacenter (e.g., 200), which may include a datacenter control system (e.g., 220), one or more computing systems configured to perform computational operations (e.g., 100), and a climate control system (e.g., 250, 260, 270, 280, and/or 290).

At step 1202, one or more control systems (e.g., 220, 420, and/or 410), based on detecting the indication, may (a) select an alternate power source for power delivery to one or more computing systems in the flexible datacenter, and (b) enable delivery from the selected alternate power source to at least one of the computing systems. For example, the datacenter control system 220 may adjust power delivery to the computing systems 100 in the flexible datacenter 200 such that one or more of the computing systems functions as an always-on system and receives power when the intermittent power generation unit is unable to supply power.

Selecting an alternate power source for power delivery to one or more computing systems 100 in the flexible datacenter 200 may involve selecting power delivery from a power grid, and preferably from the local station. The local station may therefore supply grid power to the behind-the-meter power input system 210.

Enabling power delivery from the selected alternate power source to the one or more computing systems 100 may involve enabling power delivery from the selected alternate power source to one or more always-on systems 1001 in the flexible datacenter. This way, the always-on systems 1001 may continue to receive power to perform control, communication, and/or computational operations, and/or maintain a low power state that avoids a subsequent restart of the always-on systems 1001. For example, the always-on systems 1001 may perform critical operations and/or may use the power to retain temporary memory.

In some embodiments, one or more control systems 220, 420, and/or 410 may selectively direct power delivery to the behind-the-meter power input system from a second power generation unit that is in a power generation mode based on an indication that a first power generation unit is or will be transitioning to the stand down mode. Particularly, the second power generation unit may also generate power on an intermittent basis. For example, one or more control systems 220, 420, and/or 410 may direct power to one or more computing systems 100 in the flexible datacenter 200 from another behind-the-meter power system.

Alternatively or additionally, one or more control systems 220, 420, and/or 410 may direct power to one or more computing systems 100 in the flexible datacenter 200 from an energy storage system (e.g., 1110).

In some embodiments, one or more control systems 220, 420, and/or 410 may modulate power delivery to the computing systems 100 such that a first set of computing systems 100 receive power from the grid during a first period of time and a second set of computing systems 100 may receive power from the grid during a second period of time. The second period may be subsequent to the first period.

In some embodiments, selecting the alternate power source for power delivery to one or more computing systems 100 in the flexible datacenter 200 may involve selecting power delivery to one or more always-on systems 1001 in the flexible datacenter from a local station 410, while also maintaining power delivery to one or more computing systems 100 in the flexible datacenter 200 from the intermittent power generation unit 1102. This way, intermittent (i.e., not always-on) systems 1005 may resume receiving power from the power generation unit 1102 upon the power generation unit 1102 transitioning from the stand-down mode into the operational mode while crucial computing systems 100 may continue to receive power from the selected power source (e.g., from the power grid).

In some embodiments, selecting the alternate power source for power delivery to one or more computing systems 100 in the flexible datacenter 200 may involve selecting an energy storage system (the energy storage unit 1110 of FIG. 11) to power the one or more computing systems 100. The energy storage system may supply power to the flexible datacenter 200 thereby increasing the amount of storage available in the energy storage system. As a result, the energy storage system may be recharged using low cost, free, or even negative cost power from a power source over night or another period of time. The energy storage system can then be used to supply power using the recharged power to the flexible datacenter 200.

At step 1204, the one or more control systems (e.g., 220, 420, and/or 410), may detect a second indication that the intermittent power generation unit is or will be transitioning to a power generation mode from a stand-down mode.

At step 1206, the one or more control systems (e.g., 220, 420, and/or 410), based on detecting the second indication, may (a) enable power delivery from the intermittent power generation unit to the at least one computing system, (b) disable power delivery from the selected alternate power source to the at least one computing system, and (c) direct the at least one computing system to perform computational operations.

Figure 13:
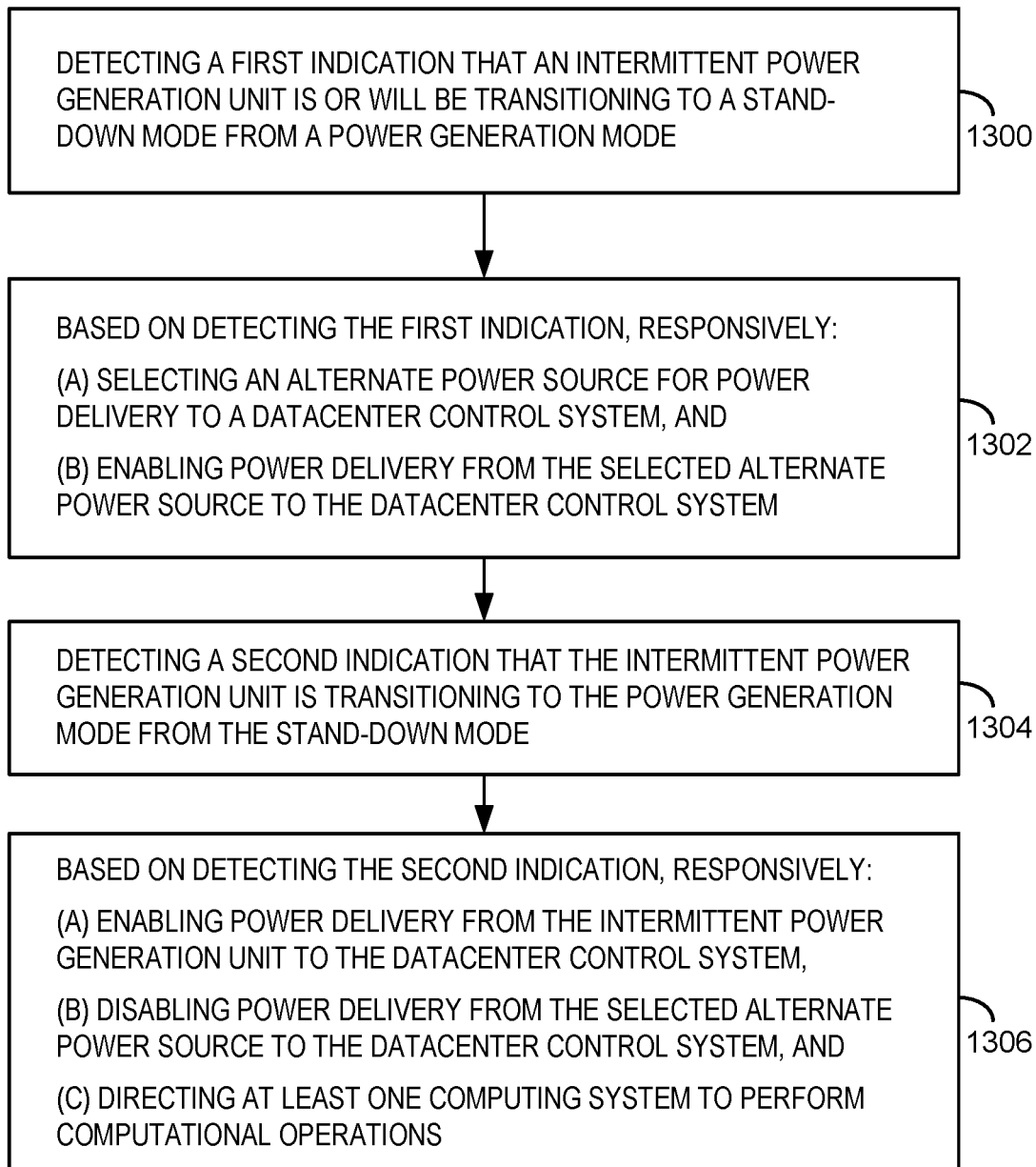
FIG. 13 shows another method of auxiliary power management of behind-the-meter power loads in accordance with one or more embodiments of the present invention.

FIG. 13 shows another method of auxiliary power management of behind-the-meter power loads in accordance with one or more embodiments of the present invention. The steps illustrated in FIG. 13 are similar to the steps of FIG. 12, and unless otherwise indicated, share the same description as the like numbered steps of FIG. 12, except the datacenter control system is substituted for the computing system(s) as the always-on system. At step 1300, one or more control systems, such as local station control system 410, datacenter control system 220, and/or remote master control system 420 may detect an indication that an intermittent power generation unit is or will be transitioning to a stand-down mode from a power generation mode. At step 1302, the one or more control systems (e.g., 220, 420, and/or 410), based on detecting the indication, may (a) select an alternate power source for power delivery to a datacenter control system, and (b) enable delivery from the selected alternate power source to the datacenter control system. At step 1304, the one or more control systems (e.g., 220, 420, and/or 410), may detect a second indication that the intermittent power generation unit is or will be transitioning to a power generation mode from a stand-down mode. At step 1306, the one or more control systems (e.g., 220, 420, and/or 410), based on detecting the second indication, may (a) enable power delivery from the intermittent power generation unit to the datacenter control system, (b) disable power delivery from the selected alternate power source to the datacenter control system, and (c) direct at least one computing system to perform computational operations.

Advantages of one or more embodiments of the present invention include one or more of the following:

One or more embodiments of the present invention provides a green solution to two prominent problems: the exponential increase in power required for growing blockchain operations and the unutilized and typically wasted energy generated from renewable energy sources.

One or more embodiments of the present invention allows for the rapid deployment of mobile datacenters to local stations. The mobile datacenters may be deployed on site, near the source of power generation, and receive unutilized behind-the-meter power when it is available.

One or more embodiments of the present invention allows for the power delivery to the datacenter to be modulated based on conditions or an operational directive received from the local station or the grid operator.

One or more embodiments of the present invention may dynamically adjust power consumption by ramping-up, ramping-down, or adjusting the power consumption of one or more computing systems within the flexible datacenter.

One or more embodiments of the present invention may be powered by behind-the-meter power that is free from transmission and distribution costs. As such, the flexible datacenter may perform computational operations, such as distributed computing processes, with little to no energy cost.

One or more embodiments of the present invention provides a number of benefits to the hosting local station. The local station may use the flexible datacenter to adjust a load, provide a power factor correction, to offload power, or operate in a manner that invokes a production tax credit and/or generates incremental revenue One or more embodiments of the present invention allows for continued operation of one or more systems within a flexible datacenter despite a connected intermittent power generation unit transitioning into a stand-down mode.

One or more embodiments of the present invention allows for continued use of one or more systems within a flexible datacenter in response to an indication that an intermittent power generation unit supplying the one or more computing systems temporarily is or will be suspending power production.

One or more embodiments of the present invention allows for continued use of one or more computing systems within a flexible datacenter in response to an emergency at a power generation unit that is supplying power to the one or more computing systems.

It will also be recognized by the skilled worker that, in addition to improved efficiencies in controlling power delivery from intermittent generation sources, such as wind farms and solar panel arrays, to regulated power grids, the invention provides more economically efficient control and stability of such power grids in the implementation of the technical features as set forth herein.

While the present invention has been described with respect to the above-noted embodiments, those skilled in the art, having the benefit of this disclosure, will recognize that other embodiments may be devised that are within the scope of the invention as disclosed herein. Accordingly, the scope of the invention should be limited only by the appended claims.

What is claimed is:

1. A system comprising:
    a first power source comprising a power generation unit, wherein the power generation unit is coupled to a grid and generates power on an intermittent basis;
    a second power source;
    a flexible datacenter comprising:
        a behind-the-meter power input system configured to receive power from (i) the first power source prior to the power undergoing step-up transformation for transmission to the grid, and (ii) the second power source,
        a set of always-on systems,
        a plurality of computing systems configured to carry out computational operations, and
        a datacenter control system; and
    a first control system configured to selectively direct power to the behind-the-meter power input system from at least one of the first power source and the second power source such that the set of always-on systems receives continuous power from the behind-the-meter power input system,
    wherein the first control system is configured to selectively direct power based on one or more monitored power system conditions that includes availability of behind-the-meter power at the flexible datacenter from the first power source, and
    wherein a selection of the first power source causes: (i) the set of always-on systems to receive the continuous power directly from the first power source and (ii) the plurality of computing systems to ramp up power consumption during performance of computational operations.

2. The system of claim 1, wherein monitored power system conditions include an indication that the power generation unit is or will be transitioning to a stand-down mode from a power generation mode.

3. The system of claim 1 wherein second power source comprises power derived from the grid.

4. The system of claim 3, wherein the second power source comprises a local station.

5. The system of claim 3, wherein the first control system is the datacenter control system.

6. The system of claim 3, wherein the first control system is a remote master control system.

7. The system of claim 3, wherein the set of always-on systems comprises the first control system.

8. The system of claim 3, wherein the set of always-on systems comprises the datacenter control system.

9. The system of claim 3, wherein the set of always-on systems comprises at least one computing system of the plurality of computing systems.

10. The system of claim 3, wherein the set of always-on systems comprises the first control system and at least one computing system of the plurality of computing systems.

11. The system of claim 3, wherein the first control system is configured to dynamically determine whether the set of always-on system includes at least one computing system of the plurality of computing systems based on the computational operations performed by the at least one computing system.

12. The system of claim 3, wherein the first control system is further configured to selectively direct power to the behind-the-meter power input system from either the first power source or the second power source, but not both simultaneously.

13. The system of claim 3, wherein the first control system is further configured to selectively direct power to the behind-the-meter power input system from both the first power source and the second power source simultaneously.

14. The system of claim 3, further comprising:
    a third power source comprising an energy storage unit,
    wherein the first control system is further configured to selectively direct power to the behind-the-meter power input system from at least one of the first power source, the second power source, and the third power source, such that the set of always-on systems receives continuous power from the behind-the-meter power input system.

15. A method comprising:
    detecting a first indication that an intermittent power generation unit is or will be transitioning to a stand-down mode from a power generation mode,
    wherein the intermittent power generation unit is coupled to a grid, generates power during the power generation mode, and does not generate power during the stand-down mode,
    wherein the intermittent power generation unit supplies the generated power as behind-the-meter power to a flexible datacenter prior to the generated power undergoing step-up transformation for transmission to the grid, and
    wherein the flexible datacenter comprises: a datacenter control system and a plurality of computing systems configured to perform computational operations; and
    based on detecting the first indication, responsively:
        (a) selecting an alternate power source for power delivery to at least one of the computing system of the plurality of computing systems, and
        (b) enabling power delivery from the selected alternate power source to the flexible datacenter such that the at least one computing system receives continuous power from the alternate power source, and
        (c) causing a set of computing systems of the plurality of computing systems to ramp down power consumption until receiving a subsequent indication that indicates the intermittent power generation unit is transitioning to the power generation mode.

16. The method of claim 15, wherein the alternate power source is power from the grid.

17. The method of claim 15, further comprising:
    detecting a second indication that the intermittent power generation unit is transitioning to the power generation mode from the stand-down mode; and based on detecting the second indication, responsively:
- (a) enabling power delivery from the intermittent power generation unit to the at least one computing system,
- (b) disabling power delivery from the selected alternate power source to the at least one computing system, and
- (c) directing the at least one computing system to perform computational operations.

18. A method comprising:

detecting a first indication that an intermittent power generation unit is or will be transitioning to a stand-down mode from a power generation mode, wherein the intermittent power generation unit is coupled to a grid, generates power during the power generation mode, and does not generate power during the stand-down mode, wherein the intermittent power generation unit supplies the generated power as behind-the-meter power to a flexible datacenter prior to the generated power undergoing step-up transformation for transmission to the grid, and wherein the flexible datacenter comprises: a datacenter control system and a plurality of computing systems configured to perform computational operations; and based on detecting the first indication, responsively:
- (a) selecting an alternate power source for power delivery to the datacenter control system,
- (b) enabling power delivery from the selected alternate power source to the datacenter control system, and
- (c) causing the plurality of computing systems to ramp down power consumption until receiving a subsequent indication that indicates the intermittent power generation unit is transitioning to the power generation mode.

19. The method of claim 18, wherein the alternate power source is power from the grid.

20. The method of claim 18, further comprising:

detecting a second indication that the intermittent power generation unit is transitioning to the power generation mode from the stand-down mode; and based on detecting the second indication, responsively:
- (a) enabling power delivery from the intermittent power generation unit to the datacenter control system
- (b) disabling power delivery from the selected alternate power source to the datacenter control system, and
- (c) directing at least one computing system to perform computational operations.

* * * * *